United States Patent
Chari et al.

(10) Patent No.: US 7,387,858 B2
(45) Date of Patent: Jun. 17, 2008

(54) REFLECTIVE DISPLAY BASED ON LIQUID CRYSTAL MATERIALS

(75) Inventors: Krishnan Chari, Fairport, NY (US); John C. Kowalczyk, Denver, CO (US); Charles M. Rankin, Jr., Penfield, NY (US); Erica N. Montbach, Pittsford, NY (US)

(73) Assignee: Industrial Technology Research Institute, Hsinchu (TW)

( * ) Notice: Subject to any disclaimer, the term of this patent is extended or adjusted under 35 U.S.C. 154(b) by 236 days.

(21) Appl. No.: 11/216,628

(22) Filed: Aug. 31, 2005

(65) Prior Publication Data
US 2006/0134349 A1 Jun. 22, 2006

Related U.S. Application Data

(63) Continuation-in-part of application No. 11/017,181, filed on Dec. 20, 2004, now abandoned.

(51) Int. Cl.
*C09K 19/00* (2006.01)
*C09K 19/52* (2006.01)

(52) U.S. Cl. .......... 430/20; 428/1.1; 428/1.2; 252/299.01; 349/176

(58) Field of Classification Search .......... 428/1.1, 428/1.2; 430/20; 252/299.01; 349/176
See application file for complete search history.

(56) References Cited

U.S. PATENT DOCUMENTS

| | | | |
|---|---|---|---|
| 4,435,047 A | 3/1984 | Fergason | |
| 4,688,900 A | 8/1987 | Doane et al. | |
| 5,363,482 A | 11/1994 | Victor et al. | |
| 5,835,174 A | 11/1998 | Clikeman et al. | |
| 6,271,898 B1 | 8/2001 | Clikeman et al. | |
| 6,423,368 B1 | 7/2002 | Stephenson et al. | |
| 6,428,868 B1 | 8/2002 | Sheridon et al. | |
| 6,704,073 B2 | 3/2004 | Stephenson et al. | |
| 2001/0050222 A1 | 12/2001 | Choi et al | |
| 2003/0013238 A1 | 1/2003 | Ogawa | |
| 2003/0137717 A1 | 7/2003 | Albert et al. | |
| 2004/0032545 A1 | 2/2004 | Stephenson | |
| 2004/0217929 A1 | 11/2004 | Albert et al. | |
| 2004/0226820 A1 | 11/2004 | Webber et al. | |
| 2006/0134564 A1* | 6/2006 | Chari et al. ......... | 430/330 |
| 2006/0215077 A1* | 9/2006 | Majumdar et al. ...... | 349/88 |
| 2006/0286309 A1* | 12/2006 | Chari et al. ......... | 428/1.1 |

OTHER PUBLICATIONS

Drzaic, P.S. in Liquid Crystal Dispersions, pp. 30-51, published by World Scientific, Singapore (1995).
Whitesides and Ross (J. Colloid Interface Sci. 169, pp. 48-59 (1995)).
Rudhardt et al. (Applied Physics Letters vol. 82, pp. 2610-2612, 2003).
U.S. Appl. No. 10/619,329, filed Jul. 14, 2003, Stephenson et al.
U.S. Appl. No. 10/688,088, filed Oct. 17, 2003, Yau et al.
U.S. Appl. No. 10/718,900, filed Nov. 21, 2003, Chari et al.
Yingwei Xizng et al., *P-82: Sphere-Supported Thin Film Electroluminescent Technology*, 2004 SID International Symposium, Seattle, Wa, May 25-27, 2004, SID International Symposium, San Jose, Ca: SID, US, May 25, 2004, pp. 558-561.

* cited by examiner

*Primary Examiner*—Geraldina Visconti
(74) *Attorney, Agent, or Firm*—Akin, Gump, Strauss, Hauer & Feld LLP

(57) ABSTRACT

The present invention relates to a high contrast reflective display comprising at least one substrate, at least one electrically conductive layer and at least one close-packed, ordered monolayer of domains of electrically modulated material in a fixed, preferably crosslinked, polymer matrix and a method of making the same.

41 Claims, 11 Drawing Sheets

US 7,387,858 B2

REFLECTIVE DISPLAY BASED ON LIQUID CRYSTAL MATERIALS

CROSS REFERENCE TO RELATED APPLICATIONS

This is a continuation-in-part of application Ser. No. 11/017,181, filed Dec. 20, 2004 now abandoned entitled "REFLECTIVE DISPLAY BASED ON LIQUID CRYSTAL MATERIALS" by Chari et al.

FIELD OF THE INVENTION

The present invention relates to a high contrast displays.

BACKGROUND OF THE INVENTION

There is significant interest in low cost flexible electronic displays. Typically, such displays comprise a light modulating component embedded in a binder (most commonly polymer) matrix that is coated over a conductive plastic support. Broadly speaking, a light modulating component is a material that changes its optical properties such as its ability to reflect or transmit light in response to an electric field. The light modulating component may be a liquid crystalline material such as a nematic liquid crystal, a chiral nematic or cholesteric liquid crystal or a ferroelectric liquid crystal. The light modulating material may also be a water insoluble liquid containing particles that undergo electrophoresis or motion such as rotation or translation in response to an electric field. Displays comprising a liquid crystalline material in a polymer matrix are referred to as polymer dispersed liquid crystal (PDLC) displays.

There are two main methods for fabricating PDLC devices: emulsion methods and phase separation methods. Emulsion methods have been described in U.S. Pat. Nos. 4,435,047 and 5,363,482. The liquid crystal is mixed with an aqueous solution containing polymer. The liquid crystal is insoluble in the continuous phase and an oil-in-water emulsion is formed when the composition is passed through a suitable shearing device, such as a homogenizer. The emulsion is coated on a conductive surface and the water allowed to evaporate. A second conductive surface may then be placed on top of the emulsion or imaging layer by lamination, vacuum deposition, or screen printing to form a device. While the emulsion methods are straightforward to implement, droplet size distributions tend to be broad resulting in a loss in performance. For cholesteric liquid crystal devices, also referred to herein as CLC devices, this typically means reduced contrast and brightness. Phase separation methods were introduced in an effort to overcome this difficulty.

Phase separation methods have been outlined in U.S. Pat. No. 4,688,900 and in Drzaic, P. S. in Liquid Crystal Dispersions, pgs. 30-51, published by World Scientific, Singapore (1995). The liquid crystal and polymer, or precursor to the polymer, are dissolved in a common organic solvent. The composition is then coated on a conductive surface and induced to phase separate by application of ultraviolet (UV) radiation or by the application of heat or by evaporation of the solvent, resulting in droplets of liquid crystal in a solid polymer matrix. A device may then be constructed utilizing this composition. Although phase separation methods produce dispersed droplets having more uniform size distributions, there are numerous problems with this approach. For example, the long term photostability of photopolymerized systems is a concern due to the presence of photoinitiators that produce reactive free radicals. Photoinitiators not consumed by the polymerization process can continue to produce free radicals that can degrade the polymer and liquid crystals over time. Furthermore, it is also known that UV radiation is harmful to liquid crystals. Specifically, exposure to UV radiation can lead to decomposition of the chiral dopant in a cholesteric liquid crystal mixture, resulting in a change in the reflected color. The use of organic solvents may also be objectionable in certain manufacturing environments.

U.S. Pat. Nos. 6,423,368 and 6,704,073 propose to overcome the problems associated with the prior art methods through the use of droplets of the liquid crystal material prepared using a limited coalescence process. In this process, the droplet-water interface is stabilized by particulate species, such as colloidal silica. Surface stabilization by particulate species such as colloidal silica is particularly preferred as it can give narrow size distribution and the size of the droplets can be controlled by the concentration of the particulate species employed. The materials prepared via this process are also referred to as Pickering Emulsions and are described more fully by Whitesides and Ross (J. Colloid Interface Sci. 169, 48 (1995)). The uniform droplets may be combined with a suitable binder and coated on a conductive surface to prepare a device. The process provides improvement in brightness and contrast over prior art processes. It also overcomes some of the problems associated with photoinitators and UV radiation. However, there is still much room for improvement, particularly in terms of the switching voltage or the voltage needed to change the orientation of the liquid crystal from one state to another. The latter has a significant effect on the overall cost of the display. A low switching voltage is extremely desirable for low cost displays.

The device described by U.S. Pat. Nos. 6,423,368 and 6,704,073 suffers from drawbacks because of the structure of the coated layer. Undesirably, there may be more than a monolayer of droplets between the two electrodes. Furthermore, the process of coating a heated emulsion of the liquid crystal in a gelatin binder onto a substrate with a conductive layer and subsequently lowering the temperature of the coating to change the state of the coated layer from a free flowing liquid to a gel state (referred to as a sol-gel transition) prior to drying the coating results in an extremely uneven distribution of droplets of liquid crystal. At the microscopic scale there are regions of the coating containing overlapping droplets and other regions with no droplets at all between the electrodes. The uneven distribution of droplets results in a decrease in contrast and an increase in switching voltage.

U.S. Pat. Nos. 6,271,898 and 5,835,174 also describe compositions suitable for flexible display applications that employ very uniform sized droplets of liquid crystal in a polymer binder. However, no attempt is made to control the thickness or the distribution of droplets in the coated layer resulting in less than optimum performance.

U.S. patent application Ser. No. 10/718,900 shows that the maximum contrast in a bistable chiral nematic liquid crystal display prepared by the limited coalescence method is obtained when the uniform liquid crystal domains or droplets are coated as substantially a monolayer on the first conductive support. The bistable states in these chiral nematic liquid crystal displays are the planar reflecting state and the weakly scattering focal conic state. Back-scattering of light from the weakly scattering focal conic state increases drastically when there is more than a monolayer of droplets between the conductive surfaces. While the method provides displays with an improvement in brightness and contrast, it still falls short of optimum performance because the gelatin binder is made to undergo a sol-gel transition prior to drying of the coating resulting in an uneven structure.

Rudhardt et al. (Applied Physics Letters vol. 82, page 2610, 2003) describe a method of fabricating a light modulating device wherein a composition containing very uniform droplets of liquid crystal in an aqueous solution of polymer binder is spread on an indium tin oxide (ITO) coated glass surface and the water allowed to evaporate. The droplets of liquid crystal spontaneously self-assemble into a hexagonal close-packed (HCP) monolayer. A second ITO coated glass surface is placed over the coated layer of droplets as the top electrode to complete construction of the device. A uniform monolayer thickness is achieved for the coated layer and the close-packed distribution of droplets is also extremely well defined. Both features result in a low switching voltage. However, there are numerous problems with this approach. Firstly, the uniform droplets of liquid crystal are prepared by extrusion through a thin capillary into a flowing fluid. When a droplet at the tip of the capillary grows to reach critical size, viscous drag exceeds surface tension and breakoff occurs, producing highly monodisperse emulsions. Clearly, this method of creating one droplet at a time is not suitable for large scale manufacture. Secondly, the method by which the second (top) electrode is applied may be suitable for construction of small scale displays on rigid substrates such as glass but is not viable for large area low cost displays on flexible substrates.

US 2003/0137717A1 and US 2004/0217929A1 indicate that a close-packed monolayer of droplets of the light modulating component may be desirable for obtaining high brightness and contrast in a polymer dispersed electrophoretic display. However the method of making droplets described in these applications is a standard emulsification process that does not result in emulsions having a narrow size distribution that is desirable for obtaining close-packed monolayers by spontaneous self-assembly. The preferred method of preparing droplets in US 2003/0137717A1 and US 2004/0217929A1 also involves encapsulation resulting in droplets or capsules in the size range of 20 to 200 microns with wall thickness of 0.2 to 10 microns. The relatively large droplet size and wall thickness result in high switching voltages. The latter is particularly a problem for bistable CLC devices. Encapsulation is clearly not desirable but these applications do not teach how a second conducting layer is to be applied on top of the coated layer of droplets in the absence of encapsulation. In the absence of encapsulation, droplets of the light modulating component may directly come in contact with the organic solvent in the screen printed conducting ink leading to contamination or poisoning of the light modulating component. This is particularly a concern if the light modulating component is a liquid crystal material.

To overcome the difficulties of US 2003/0137717A1 and US 2004/0217929A1, US 2004/0226820A1 teaches that a close-packed monolayer of droplets may be obtained by using electro-deposition followed by washing after the droplets have been spread on a suitable surface using a coating knife or coating head such as a slot die coating head. However, the additional steps of electro-deposition and washing are cumbersome and not suitable for manufacturing on a large scale. Even with these additional steps, a close-packed monolayer of uniform thickness is not achieved. The root mean square (RMS) surface roughness is about 6 microns because of non-uniform droplets or capsules. This is a very high value of surface roughness that would result in irregular or incomplete curing if a UV curable screen printed conducive ink is used as the second electrode. The irregular curing will result in increased switching voltages. Furthermore, a surface roughness of this magnitude will also result in significant non-uniformity of switching voltage across the area of the display since the switching voltage is directly related to the thickness of the coated layer.

US 2003/0137717A1, US 2004/0217929A1 and US 2004/0226820A1 also teach using polymer latex as the preferred binder. The use of polymer latex materials is not desirable for a number of reasons. Many commercial latex materials contain high boiling organic co-solvents that render them unsuitable for use in PDLC films due to the poisoning effect the solvents have on the liquid crystal or other light modulating component. This is particularly true if the droplets are not encapsulated as is desirable from the point of view of reduced switching voltage. Latex polymers also have an affinity for the liquid crystal or other light modulating component leading to dissolution of the light modulating component into the polymer matrix. Furthermore, if the latex is not fully transparent, it can lead to a loss of contrast. Other binders suggested in US 2004/0217929A1 such as acrylics or polyvinylalcohol are difficult to fix or cross-link if used alone. Fixing or cross-linking is desired in order to preserve the close-packed monolayer structure when other layers are spread over it.

U.S. Pat. No. 5,847,798 discloses a liquid crystalline light modulating cell and material, characterized by liquid crystalline light modulating material of liquid crystal and polymer, the liquid crystal being a chiral nematic liquid crystal having positive dielectric anisotropy and including chiral material in an amount effective to form focal conic and twisted planar textures, the polymer being distributed in phase separated domains in the liquid crystal cell in an amount that stabilizes the focal conic and twisted planar textures in the absence of a field and permits the liquid crystal to change textures upon the application of a field. In one embodiment, the material is light scattering in a field-OFF condition and optically clear in a field-ON condition, while in another embodiment, the material is optically clear in a field-OFF condition and light scattering in a field-ON condition. In still another embodiment, a black-white cholesteric reflective display can be realized by employing a polymer concentration of about three percent based on the combined weight of all the material contained within the cell. A cholesteric material which has an intrinsic pitch of about 600 nm results in a display which appears much like a newspaper or book page. In other words, by selecting in combination the proper polymer concentration and intrinsic pitch of the liquid crystal material, a substantially white page or surface with black characters thereon can be obtained. This embodiment allows for a display with a substantially white background with substantially black characters much like a printed page. However, this embodiment has a cell consisting of two substrates, one on either side of the liquid crystal polymer film.

U.S. Pat. No. 6,833,891 discloses a reflective liquid crystal display (LCD) including a cholesteric liquid crystal polarizing device and a liquid crystal cell superimposed with one another. In various embodiments, the reflective LCD may be a normally white mode or normally black mode device. In another variation, the liquid crystal cell may include a 90° twisted nematic liquid crystal. Unlike the current invention, this invention includes a 90 degree twisted nematic LCD to modulate the light output.

U.S. Pat. Publ. No. 2004/0223098 discloses a display device displaying a color by mixing light reflected by a first reflection element and light reflected by a second reflection element by additive color mixture, in which the light of a first wavelength reflected by the first reflection element and light of a second wavelength reflected by the second reflection element have a mutually complementary color relationship. Thus, the display device, which can make good black and white display by a simple structure and can be driven by a simple method, can be realized. Unlike the current invention, this invention has 2 layers of cholesteric, for instance one blue and one yellow, using additive color the mixture is white.

U.S. Pat. Publ. No. 2004/0125284 discloses a chiral nematic display configuration, typically in liquid crystal displays, comprising a chiral nematic display of controllable planar structure and focal conic structure, characterised by the chiral nematic liquid crystal material being between two transparent substrates having conductive electrodes, the material being between two elliptical polarizers and there being an optical reflector. The invention achieves a high contrast black-and-white display. The displays in the embodiment are first and second optical mode configurations of the black-and-white chiral nematic displays. Unlike the current invention, this invention utilizes elliptical polarizers on either side of the cholesteric liquid crystal to absorb or transmit the light transmitted by the cholesteric liquid crystal.

For these reasons, an alternative approach is clearly needed.

PROBLEM TO BE SOLVED

There remains a need for a reduced cost, display having excellent brightness, high contrast, and low switching voltage.

SUMMARY OF THE INVENTION

The present invention relates to a high contrast reflective display comprising at least one substrate, at least one electrically conductive layer and at least one close-packed, ordered monolayer of domains of electrically modulated material in a fixed polymer matrix and a method of making the same.

ADVANTAGEOUS EFFECT OF THE INVENTION

The present invention includes several advantages, not all of which are incorporated in a single embodiment. The current single substrate displays have a small distribution of wavelengths reflected this will allow for broadband reflection and black for the dark state. This is much more pleasing so the eye then monochrome displays. By selecting, in combination with the light modulating material with an intrinsic pitch, a UV curable polymer in a proper concentration, a substantially white page or surface with black characters thereon can be obtained. Accordingly, the black-white cholesteric reflective display provides a pleasing appearance and reduced eyestrain while reading the characters on the display when compared to other currently known liquid crystal reflective displays, while being pressure insensitive and using one substrate.

DETAILED DESCRIPTION OF THE INVENTION

Figure 1:
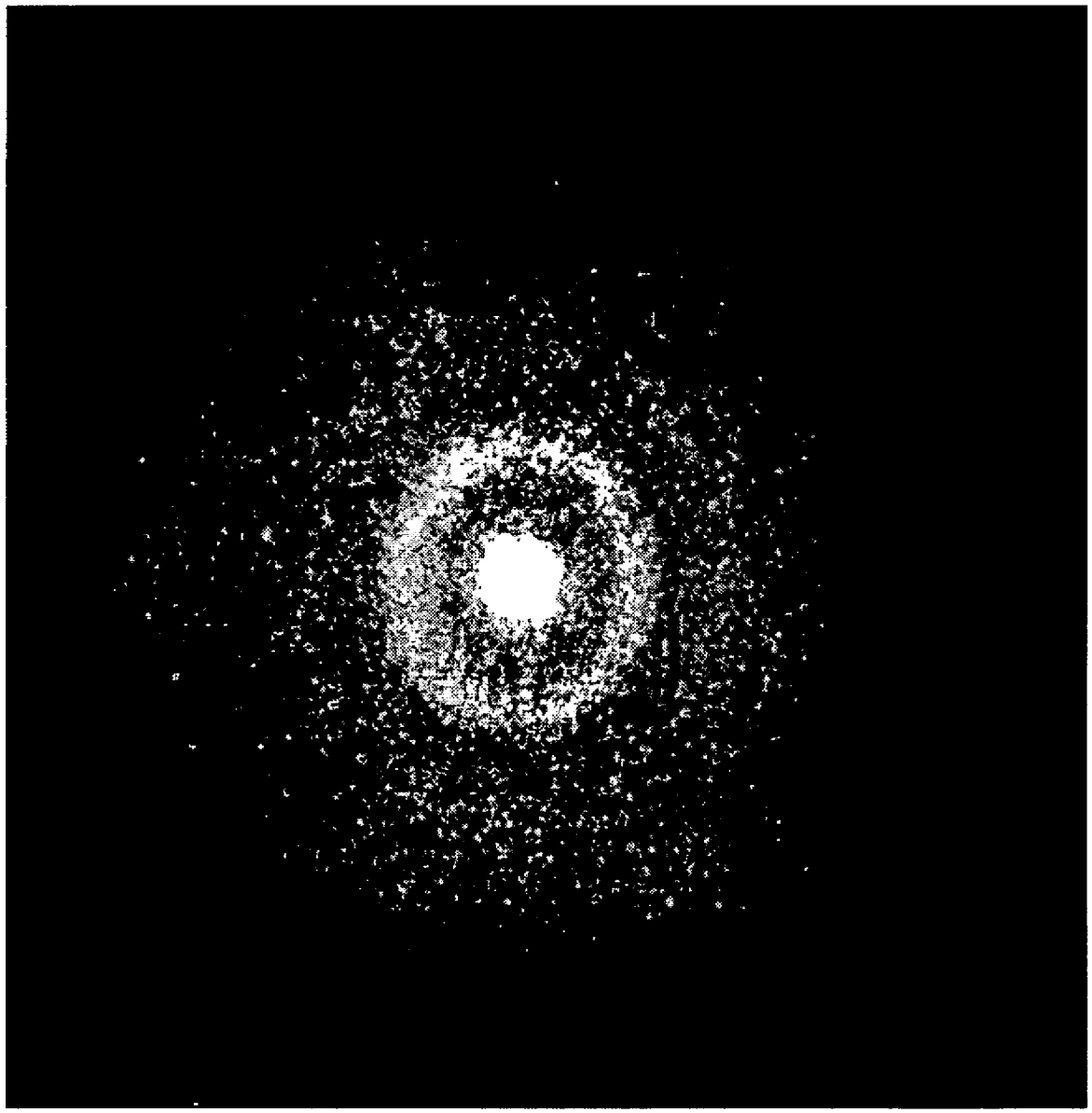
FIG. 1 represents the diffraction pattern caused by Fraunhofer diffraction of light indicating a close-packed ordered monolayer of chiral nematic liquid crystal (CLC) droplets (or droplets of the light modulating material) in the coating of the invention.

The present invention relates to a high contrast reflective display comprising at least one substrate, at least one electrically conductive layer and at least one close-packed, ordered monolayer of domains of electrically modulated material in a fixed, preferably crosslinked, polymer matrix and a method of making the same. In the preferred embodiment, the electrically modulated material is a chiral nematic liquid crystal incorporated in a polymer matrix. Chiral nematic liquid crystalline materials may be used to create electronic displays that are both bistable and viewable under ambient lighting. Furthermore, the liquid crystalline materials may be dispersed as micron sized droplets in an aqueous medium, mixed with a suitable binder material and coated on a flexible conductive support to create potentially low cost displays. The operation of these displays is dependent on the contrast between the planar reflecting state and the weakly scattering focal conic state. In order to derive the maximum contrast from these displays, it is desired that the chiral nematic liquid crystal domains or droplets are spread on a conductive support as a close-packed ordered monolayer. It is possible to prepare such an ordered monolayer by first applying an aqueous dispersion of chiral nematic liquid crystal domains to the substrate in the presence of a suitable binder, allowing the domains or droplets to self-assemble into a close-packed ordered monolayer, preferably a hexagonal close-packed (HCP) monolayer and then allowing the binder material to set, become fixed or crosslink to preserve the close-packed ordered monolayer structure so that other aqueous layers can be spread above the imaging layer without affecting the close-packed structure.

In general, the light modulating imaging layer contains electrically modulated material domains dispersed in a binder. For purposes of the present invention domains are defined to be synonymous with micelles and/or droplets. The electrically modulated material may be electrochromic material, rotatable microencapsulated microspheres, liquid crystal materials, cholesteric/chiral nematic liquid crystal materials, polymer dispersed liquid crystals (PDLC), polymer stabilized liquid crystals, surface stabilized liquid crystals, smectic liquid crystals, ferroelectric material, electroluminescent material or any other of a very large number of light modulating imaging materials known in the prior art. The domains of the electrically modulated imaging layer include droplets having uniform domain size, with few, if any, parasitic domains, which are domains with random or uncontrolled sizes and which have undesirable electro-optical properties, within the dried coatings, as described in previous patent art.

The display includes a suitable electrically modulated material disposed on a suitable support structure, such as on or between one or more electrodes. The term "electrically modulated material" as used herein is intended to include any suitable nonvolatile material. Suitable materials for the electrically modulated material are described in U.S. patent application Ser. No. 09/393,553 and U.S. Provisional Patent Application Ser. No. 60/099,888, the contents of both applications are herein incorporated by reference.

The electrically modulated material may also be an arrangement of particles or microscopic containers or microcapsules. Each microcapsule contains an electrophoretic composition of a fluid, such as a dielectric or emulsion fluid, and a suspension of colored or charged particles or colloidal material. According to one practice, the particles visually contrast with the dielectric fluid. According to another example, the electrically modulated material may include rotatable balls that can rotate to expose a different colored surface area, and which can migrate between a forward viewing position and/or a rear nonviewing position, such as gyricon. Specifically, gyricon is a material comprised of twisting rotating elements contained in liquid filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon materials are disclosed in U.S. Pat. Nos. 6,147,791, 4,126,854 and 6,055,091, the contents of which are herein incorporated by reference.

According to one practice, the microcapsules may be filled with electrically charged white particles in a black or colored dye. Examples of electrically modulated material suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The electrically modulated material may also include material disclosed in U.S. Pat. No. 6,025,896, the contents of which are incorporated herein by reference. This material comprises charged particles in a liquid dispersion medium encapsulated in a large number of microcapsules. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material.

Further, the electrically modulated material may include a thermochromic material. A thermochromic material is capable of changing its state alternately between transparent and opaque upon the application of heat. In this manner, a thermochromic imaging material develops images through the application of heat at specific pixel locations in order to form an image. The thermochromic imaging material retains a particular image until heat is again applied to the material. Since the rewritable material is transparent, UV fluorescent printings, designs and patterns underneath can be seen through.

The electrically modulated material may also include surface stabilized ferrroelectric liquid crystals (SSFLC). Surface stabilized ferroelectric liquid crystals confining ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bistable nonvolatile imaging materials are available and may be implemented in the present invention.

The electrically modulated material may also be configured as a single color, such as black, white or clear, and may be fluorescent, iridescent, bioluminescent, incandescent, ultraviolet, infrared, or may include a wavelength specific radiation absorbing or emitting material. There may be multiple layers of electrically modulated material. Different layers or regions of the electrically modulated material may have different properties or colors. Moreover, the characteristics of the various layers may be different from each other. For example, one layer can be used to view or display information in the visible light range, while a second layer responds to or emits ultraviolet light. The nonvisible layers may alternatively be constructed of nonelectrically modulated material based materials that have the previously listed radiation absorbing or emitting characteristics. The electrically modulated material employed in connection with the present invention preferably has the characteristic that it does not require power to maintain display of indicia.

The most preferred electrically modulated material is a light modulating material, such as a liquid crystalline material. The liquid crystalline material can be one of many different liquid crystal phases such as; nematic (N), chiral nematic (N*), or smectic, depending upon the arrangement of the molecules in the mesophase. Chiral nematic liquid crystal (N*LC) displays are preferably reflective, that is, no backlight is needed, and can function without the use of polarizing films or a color filter.

Chiral nematic liquid crystal refers to the type of liquid crystal having finer pitch than that of twisted nematic and super twisted nematic used in commonly encountered liquid crystal devices. Chiral nematic liquid crystals are so named because such liquid crystal formulations are commonly obtained by adding chiral agents to host nematic liquid crystals. Chiral nematic liquid crystals may be used to produce bistable or multi-stable displays. These devices have significantly reduced power consumption due to their nonvolatile "memory" characteristic. Since such displays do not require a continuous driving circuit to maintain an image, they consume significantly reduced power. Chiral nematic displays are bistable in the absence of a field, the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known LCD devices include chemically etched, transparent, conductive layers overlying a glass substrate as described in U.S. Pat. No. No. 5,667,853, incorporated herein by reference. Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory.

Modern chiral nematic liquid crystal materials usually include at least one nematic host combined with a chiral dopant. In general, the nematic liquid crystal phase is composed of one or more mesogenic components combined to provide useful composite properties. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenyl cyclohexanes, cyclohexylbiphenyls, phenyl cyclohexylcyclohexanes, cyclohexylcyclohexanes, cyclohexylcyclohexenes, cyclohexylcyclohexylcyclohexenes, 1,4-bis-cyclohexylbenzenes, 4,4-bis-cyclohexylbiphenyls, phenyl- or cyclohexylpyrimidines, phenyl- or cyclohexylpyridines, phenyl- or cyclohexylpyridazines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2',2-biphenylethanes, 1-phenyl-2-cyclohexylphenylethanes, optionally halogenated stilbenes, benzyl phenyl ethers, tolanes, substituted cinnamic acids and esters, and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'—X—Y—Z—R"

wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, —B-Phe- and —B-Cyc-, wherein Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl)ethyl, pyrimidine-2,5-diyl, pyridine-2,5-diyl or 1,3-dioxane-2,5-diyl. Y in these compounds is selected from the following bivalent groups —CH=CH—, —C≡C—, —N=N(O)—, —CH=CY'—, —CH=N(O)—, —CH2—CH2—, —CO—O—, —CH2—O—, —CO—S—, —CH2—S—, —COO-Phe-COO— or a single bond, with Y' being halogen, preferably chlorine, or —CN, R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in light modulating liquid crystal compositions. Chiral nematic liquid crystal materials and cells, as well as polymer stabilized chiral nematic liquid crystals and cells, are well known in the art and described in, for example, U.S. patent application Ser. Nos. 07/969,093, 08/057,662, Yang et al., Appl. Phys. Lett. 60(25) pp 3102-04 (1992), Yang et al., J. Appl. Phys. 76(2) pp 1331 (1994), published International Patent Application No. PCT/US92/09367, and published International Patent Application No. PCT/US92/03504, all of which are incorporated herein by reference.

Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100. TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: for example, G. Gottarelli and G. Spada, *Mol. Cryst. Liq. Crys.*, 123, 377 (1985), G. Spada and G. Proni, *Enantiomer*, 3, 301 (1998) and references therein. Typical well known dopant classes include 1,1-binaphthol derivatives, isosorbide and similar isomannide esters as disclosed in U.S. Pat. No. 6,217,792, TADDOL derivatives as disclosed in U.S. Pat. No. 6,099,751, and the pending spiroindanes esters as disclosed in U.S. patent application Ser. No. 10/651,692 by T. Welter et al., filed Aug. 29, 2003, titled "Chiral Compounds And Compositions Containing The Same," hereby incorporated by reference.

The pitch length of the liquid crystal materials may be adjusted based upon the following equation (1):

$$\lambda_{max} = n_{av} p_0$$

where $\lambda_{max}$ is the peak reflection wavelength, that is, the wavelength at which reflectance is a maximum, $n_{av}$ is the average index of refraction of the liquid crystal material, and $p_0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP \cdot c)$$

where c is the concentration of the chiral dopant and HTP is the proportionality constant.

For some applications, it is desired to have liquid crystal mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand held PCs, PDAs, e-books, camcorders, satellite navigation systems, store and supermarket pricing systems, highway signs, informational displays, smart cards, toys, and other electronic devices.

The liquid crystalline droplets or domains are typically dispersed in a continuous binder. In one embodiment, a chiral nematic liquid crystal composition may be dispersed in a continuous polymeric matrix. Such materials are referred to as "polymer dispersed liquid crystal" materials or "PDLC" materials. Suitable hydrophilic binders include both naturally occurring substances such as proteins, protein derivatives, cellulose derivatives (for example cellulose esters), gelatins and gelatin derivatives, polysaccahrides, casein, and the like, and synthetic water permeable colloids such as poly(vinyl lactams), acrylamide polymers, latex, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

Gelatin is derived from a material called collagen. Collagen has a high content of glycine and of the imino acids proline and hydroxyproline. It has a triple helix structure made up of three parallel chains. When collagen in water is heated above a certain temperature, it will denature to form gelatin. Concentrated gelatin solutions form rigid gels when cooled. This phenomenon is known as sol-gel transition or thermal gelation and is the result of secondary bonding, such as hydrogen bonding, between gelatin molecules in solution. It should be noted that this property is not limited to gelatin; for example, aqueous solutions of agar, a polysaccharide from seaweed, will also form rigid gels upon cooling. Partial renaturation of gelatin also occurs upon cooling. The latter refers to the formation of triple helix collagen-like structures. The structures do not form if gelatin is not chill set prior to drying. In other words, molecules of gelatin remain in a random coil configuration if the coating is dried at a temperature that is above the sol-gel transition temperature. The presence of helix structures may be detected by x-ray diffraction. Chill set gelatin containing molecules in a helix configuration has relatively low solubility in cold water and organic solvents compared to the random coil gelatin. This property enables chill set gelatin to be an effective barrier between the organic solvent in printed conductive inks and the light modulating material.

Useful "gelatins," as that term is used generically herein, include alkali treated gelatin (cattle bone or hide gelatin), acid treated gelatin (pigskin gelatin), fish skin gelatin and gelatin derivatives such as acetylated gelatin, and phthalated gelatin. Any type of gelatin may be used, provided the gelatin has sufficient molecular weight to allow the crosslinker to crosslink or the fixative to fix or set. Fish gelatins have lower imino acid content compared to mammalian gelatins. The sol-gel transition temperature or thermal gelation temperature or chill set temperature is lower if the imino acid content is smaller. For example, the chill set temperature of gelatins derived from deep water fish such as cod, haddock or pollock is significantly lower than that of cattle gelatin. Aqueous solutions of these gelatins remain fluid until about 10° C. whereas solutions of cattle gelatin will gel at room temperature. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water soluble polyvinyl compounds such as polyvinyl alcohol, polyacrylamide, poly(vinylpyrrolidone), and the like. Useful liquid crystal to gelatin ratios should be between 6:1 and 0.5:1 liquid crystal to gelatin, preferably 3:1.

Other organic binders such as polyvinyl alcohol (PVA) or polyethylene oxide (PEO) can be used as minor components of the binder in addition to gelatin. Such compounds are preferably machine coatable on equipment associated with photographic films.

It is desirable that the binder has a low ionic content. The presence of ions in such a binder hinders the development of an electrical field across the dispersed liquid crystal material. Additionally, ions in the binder can migrate in the presence of an electrical field, chemically damaging the light modulating layer. The coating thickness, size of the liquid crystal domains, and concentration of the domains of liquid crystal materials are designed for optimum optical properties. Heretofore, the dispersion of liquid crystals is performed using shear mills or other mechanical separating means to form domains of liquid crystal within light modulating layer.

A conventional surfactant can be added to the emulsion to improve coating of the layer. Surfactants can be of conventional design, and are provided at a concentration that corresponds to the critical micelle concentration (CMC) of the solution. A preferred surfactant is Aerosol OT, commercially available from Cytec Industries, Inc.

In a preferred embodiment, the liquid crystal and gelatin emulsion are coated and dried to optimize the optical properties of the light modulating layer. In one embodiment, the layer is coated to provide a final coating containing a substantial monolayer of N*LC domains. The term "substantial monolayer" is defined by the Applicants to mean that, in a direction perpendicular to the plane of the display, there is no more than a single layer of domains sandwiched between the electrodes over 90% of the area of the display (or the imaging layer).

The amount of material needed for a monolayer can be determined by calculation based on individual domain size. Furthermore, improved viewing angle and broadband features may be obtained by appropriate choice of differently doped domains based on the geometry of the coated droplet and the Bragg reflection condition.

The addition of a bacteriostat prevents gelatin degradation during emulsion storage and during material operation. The gelatin concentration in the emulsion when coated is preferably between about 2 and 20 weight percent based on the weight of the emulsion. In the final emulsion, the liquid crystal material may be dispersed at 15% concentration in a 5% gelatin aqueous solution.

A crosslinking agent or hardener may be used to preserve the architecture of the close-packed monolayer of coated droplets after it has been formed by self-assembly. Other methods of fixing the architecture of the close-packed monolayer of domains may also be used, although crosslinking is preferred. The effects of the crosslinker may be characterized based on the reaction of certain amino acid residues in gelatin. For example, the amount of histadine is typically reduced from about 4 residues per 1000 to less than 2.5 residues per 1000 upon cross-linking. Also the amount of hydroxylysine is reduced from about 6.9 residues per 1000 to less than 5.1 residues per 1000. Many conventional hardeners are known to crosslink gelatin. Gelatin crosslinking agents (i.e., the hardener) are included in an amount of at least about 0.01 wt. % and preferably from about 0.1 to about 10 wt. % based on the weight of the solid dried gelatin material used (by dried gelatin it is meant substantially dry gelatin at ambient conditions as for example obtained from Eastman Gel Co., as compared to swollen gelatin), and more preferably in the amount of from about 1 to about 5 percent by weight. More than one gelatin crosslinking agent can be used if desired. Suitable hardeners may include inorganic, organic hardeners, such as aldehyde hardeners and olefinic hardeners. Inorganic hardeners include compounds such as aluminum salts, especially the sulfate, potassium and ammonium alums, ammonium zirconium carbonate, chromium salts such as chromium sulfate and chromium alum, and salts of titanium dioxide, and zirconium dioxide. Representative organic hardeners or gelatin crosslinking agents may include aldehyde and related compounds, pyridiniums, olefins, carbodiimides, and epoxides. Thus, suitable aldehyde hardeners include formaldehyde and compounds that contain two or more aldehyde functional groups such as glyoxal, gluteraldehyde and the like. Other preferred hardeners include compounds that contain blocked aldehyde functional groups such as aldehydes of the type tetrahydro-4-hydroxy-5-methyl-2(1H)-pyrimidinone polymers (Sequa SUNREZ® 700), polymers of the type having a glyoxal polyol reaction product consisting of 1 anhydroglucose unit: 2 glyoxal units (SEQUAREZ® 755 obtained from Sequa Chemicals, Inc.), DME-Melamine non-formaldehyde resins such as Sequa CPD3046-76 obtained from Sequa Chemicals Inc., and 2,3-dihydroxy-1,4-dioxane (DHD). Thus, hardeners that contain active olefinic functional groups include, for example, bis-(vinylsulfonyl)-methane (BVSM), bis-(vinylsulfonyl-methyl) ether (BVSME), 1,3,5-triacryloylhexahydro-s-triazine, and the like. In the context of the present invention, active olefinic compounds are defined as compounds having two or more olefinic bonds, especially unsubstituted vinyl groups, activated by adjacent electron withdrawing groups (The Theory of the Photographic Process, 4th Edition, T. H. James, 1977, Macmillan Publishing Co., page 82). Other examples of hardening agents can be found in standard references such as The Theory of the Photographic Process, T. H. James, Macmillan Publishing Co., Inc. (New York 1977) or in Research Disclosure, September 1996, Vol. 389, Part IIB (Hardeners) or in Research Disclosure, September 1994, Vol. 365, Item 36544, Part IIB (Hardeners). Research Disclosure is published by Kenneth Mason Publications, Ltd., Dudley House, 12 North St., Emsworth, Hampshire P010 7DQ, England. Olefinic hardeners are most preferred, as disclosed in U.S. Pat. Nos. 3,689,274, 2,994,611, 3,642,486, 3,490,911, 3,635,718, 3,640,720, 2,992,109, 3,232,763, and 3,360,372.

Among hardeners of the active olefin type, a preferred class of hardeners particularly are compounds comprising two or more vinyl sulfonyl groups. These compounds are hereinafter referred to as "vinyl sulfones". Compounds of this type are described in numerous patents including, for example, U.S. Pat. Nos. 3,490,911, 3,642,486, 3,841,872 and 4,171,976. Vinyl sulfone hardeners are believed to be effective as hardeners as a result of their ability to crosslink polymers making up the colloid.

The liquid crystalline droplets or domains may be formed by any method, known to those of skill in the art, which will allow control of the domain size. For example, Doane et al. (*Applied Physics Letters,* 48, 269 (1986)) disclose a PDLC comprising approximately 0.4 µm droplets of nematic liquid crystal 5CB in a polymer binder. A phase separation method is used for preparing the PDLC.

A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a PDLC comprising a chiral nematic mixture in a polymer binder. Once again a phase separation method is used for preparing the PDLC. The liquid crystal material and polymer (a hydroxy functionalized polymethylmethacrylate) along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments.

In a preferred embodiment, a method referred to as "limited coalescence" is used to form uniformly sized emulsions of liquid crystalline material. For example, the liquid crystal material can be homogenized in the presence of finely divided silica, a coalescence limiting material, such as LUDOX® from DuPont Corporation. A promoter material can be added to the aqueous bath to drive the colloidal particles to the liquid-liquid interface. In a preferred embodiment, a copolymer of adipic acid and 2-(methylamino)

ethanol can be used as the promoting agent in the water bath. The liquid crystal material can be dispersed using ultrasound to create liquid crystal domains below 1 micron in size. When the ultrasound energy is removed, the liquid crystal material coalesces into domains of uniform size. The limited coalescence process is described more fully by Whitesides and Ross (J. Colloid Interface Sci. 169, 48 (1995)), by Giermanska-Kahn, Schmitt, Binks and Leal-Calderon (Langmuir, 18, 2515 (2002)), and U.S. Pat. No. 6,556,262, all incorporated herein by reference.

The distribution of droplet sizes is such that the coefficient of variation (cv) defined as the standard deviation of the distribution divided by the arithmetic mean is less than 0.25, preferably less than 0.2 and most preferably less than 0.15. The limited coalescent materials can be coated using a photographic emulsion coating machine onto sheets of polyester having an ITO coating with a sheet conductivity of 300 ohms per square. The coating can be dried to provide a polymerically dispersed cholesteric coating. By using limited coalescence, there are few, if any, parasitic smaller domains (having undesirable electro-optical properties) within the dried coatings.

The size ranges of domains in the dried coating are varied as the mixture dries and the domains flatten. In one embodiment, the resulting domains are flattened by the drying process and have on average a thickness substantially less than their length. The flattening of the domains can be achieved by proper formulation and sufficiently rapid drying of the coating.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried. Most preferably the imaging layer or light modulating layer has a thickness between 2 to 6 microns, particularly if the light modulating material is a chiral nematic liquid crystal.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

In U.S. Pat. No. 3,600,060, incorporated herein by reference, the domains of the dried light modulating material had particle size varying in diameter by a ratio of 10:1. This creates large domains and smaller parasitic domains. Parasitic domains have reduced characteristics when compared with optimized larger domains. The reduced characteristics include reduced brightness and if the parasitic domains are small enough diminished bistability of the cholesteric liquid crystal.

The dispersed domains have an average diameter of 2 to 30 microns, preferably 5 to 15 microns. The domains are dispersed in an aqueous suspension. The size ranges for the dried coating are varied as the mixture dries and the domains flatten.

By varying the amount of silica and copolymer relative to the liquid crystalline material, uniform domain size emulsions of the desired average diameter (by microscopy), can be produced. This process produces domains of a selected average diameter.

The resulting domains are flattened by the drying process and have on average a thickness substantially less than their length, preferably at least 50% less. More preferably, the domains on average have a thickness (depth) to length ratio of 1:2 to 1:10.

For optimal performance one requires a monolayer of coated droplets having a close-packed structure of uniform thickness. Calculations by Yang and Mi (J. Phys. D: Appl. Phys. Vol. 33, page 672, 2000) have shown that for a chiral nematic liquid crystalline material of a given handedness, maximum reflectance is obtained if the thickness of the chiral nematic liquid crystal material between the electrodes is about ten times the pitch of the chiral nematic helix. For a green reflecting chiral nematic liquid crystal material with $\lambda_{max}$ of 550 nm and $n_{av}$ of 1.6 the pitch is 344 nm. Therefore, maximum reflectance is obtained for a 3.4 µm thick layer of this material. For chiral nematic liquid crystal materials that reflect in the red and near infrared portions of the spectrum, the pitch and therefore the thickness of the coated layer needed for maximum reflectance will be somewhat higher but even in these cases a thickness of about 5 µm is sufficient, if the refractive index is close to 1.6. In other words, increasing the thickness of the layer beyond this does not provide an increase in reflectance.

It is also well documented that the switching voltage increases linearly with thickness. Since it is desirable to have the lowest possible switching voltage, a uniform thickness of about 5 µm is most preferred for the coated layer of droplets, provided the droplets have a close-packed structure. Under certain conditions, monodisperse droplets of the light modulating material will spontaneously self-assemble on a surface into a hexagonal close-packed (HCP) structure. The process has been described in detail by Denkov et al. (Nature, vol. 361, p. 26, 1993). When an aqueous suspension of droplets is spread on a surface, the droplets initially assume a random, disordered or uncorrelated distribution. However, as a function of drying, when the level of water reaches the top of the droplets, there is a strong attractive force known as the capillary force that drives the droplets into a close-packed ordered or correlated structure. The attractive energy of the capillary force is much greater than the thermal energy. However, it is important that lateral movement of droplets is not impeded by a strong attraction to the surface or by an increase in viscosity of the medium in which they are suspended. The latter would happen if the binder is gelatin and the coated layer of droplets is chill set prior to drying.

The formation of a close-packed structure in two dimensions, starting from a random distribution of droplets, is sometimes referred to as two-dimensional crystallization and should have a monodisperse population of droplets or a population of droplets having low polydispersity (Kumacheva et al. Physical Review Letters vol. 91, page 1283010-1, 2003). A population of droplets of light modulating material having sufficiently low polydispersity to create a close-packed structure may be achieved by the limited coalescence process. The close-packed structure is readily observable under an optical microscope. Furthermore, the close-packed structure has a repeat pattern or periodicity wherein the repeat distance is of the order of the wavelength of visible light. A coating having such a pattern exhibits Fraunhofer diffraction when placed before a source of visible light such as a visible light laser. The phenomenon of Fraunhofer diffraction is described more fully by Lisensky et al. Journal of Chemical Education, vol. 68, February 1991.

For perfectly monodisperse droplets (cv less than 0.1), a hexagonal close-packed (HCP) structure is obtained. The diffraction pattern for such a structure is in the form of spots. If there is a minor level of polydispersity (cv between 0.1 and 0.2), the diffraction pattern of the close-packed structure is in the form of a single ring or a set of concentric rings.

The close-packed monolayer structure of coated droplets may be preserved by fixing or crosslinking the binder. This allows a second aqueous layer to be coated above the layer containing the light modulating material without disturbing the close-packed organization. In a preferred embodiment, the second layer functions as a protective overcoat for the light modulating material.

One embodiment of the present invention also may provide a broad band cholesteric reflection, which allows for black and white operation of polymer dispersed cholesteric LC displays. This is achieved by doping the LC with a UV curable polymer which distributes the helical axes of the LC to allow for reflection at many wavelengths. The high contrast reflective display of this embodiment utilizes at least one electronically modulated imaging layer comprising a chiral nematic liquid crystal light modulating material having positive dielectric anisotropy and a pitch length effective to reflect light of approximately 600 nm and a UV curable polymer. The chiral nematic liquid crystal light modulating material and the UV curable polymer cooperate to form focal conic textures and twisted planar textures that are stable in the absence of a field. The twisted planar texture is light reflecting and appears substantially white, while the focal conic texture is weakly scattering. This weakly scattering focal conic texture may appear as the same color as surrounding layers, if the surrounding layers are colored. For example, the weakly scattering focal conic texture may appear as the same color as the rearmost surface of the display or a color contrast layer located behind the rearmost surface, wherein said focal conic texture appears substantially the same color as a color contrast layer located to the rear of the LC layer. It should be noted that "rearmost" is determined as being further away from the point of viewing of the display, typically, further away from the transparent support. In a black and white display, the rearmost layer or color contrast layer is black.

The material used to form the UV curable polymer networks is soluble with the chiral nematic liquid crystal and phase separates upon polymerization to form phase separated polymer domains. Suitable UV curable polymer materials may be selected from UV (ultra violet) curable, thermoplastic and thermosetting polymers, including polymers formed from monomers having at least two polymerizable double bonds so as to be cross-linkable, polymethylmethacrylates, bisacrylates, hydroxyfunctionalized polymethacrylates and epoxy systems to name a few. The amount of UV curable polymer to be used depends upon the UV curable polymer. Useful results have been obtained with UV curable polymer contents ranging from about 1.5 to about 40% depending upon the UV curable polymer. For black and white display units, it has been found that optimal results are obtained when the UV curable polymer content of the liquid crystal material is about 3%.

Figure 6:
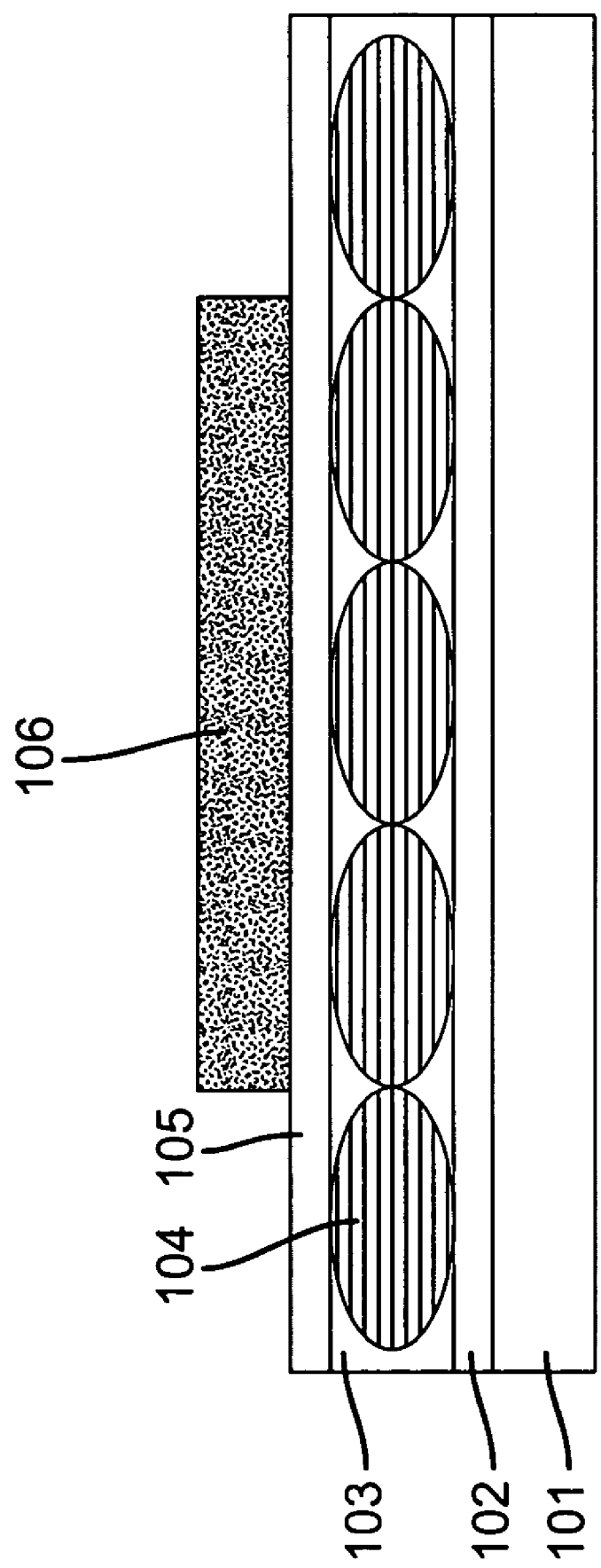
FIG. 6 illustrates a display based on one embodiment of the invention.

A preferred embodiment of the display device shown in FIG. 6 comprises a clear flexible support 101 with a clear conducting layer 102. The imaging layer or light modulating layer (layer 1) contains a close-packed monolayer of droplets of the light modulating material 104 along with crosslinked binder 103 in a random coil configuration. A protective overcoat 105 is composed of polymer in a helix configuration. The second electrode 106 comprises screen printed carbon conductive ink.

Figure 7:
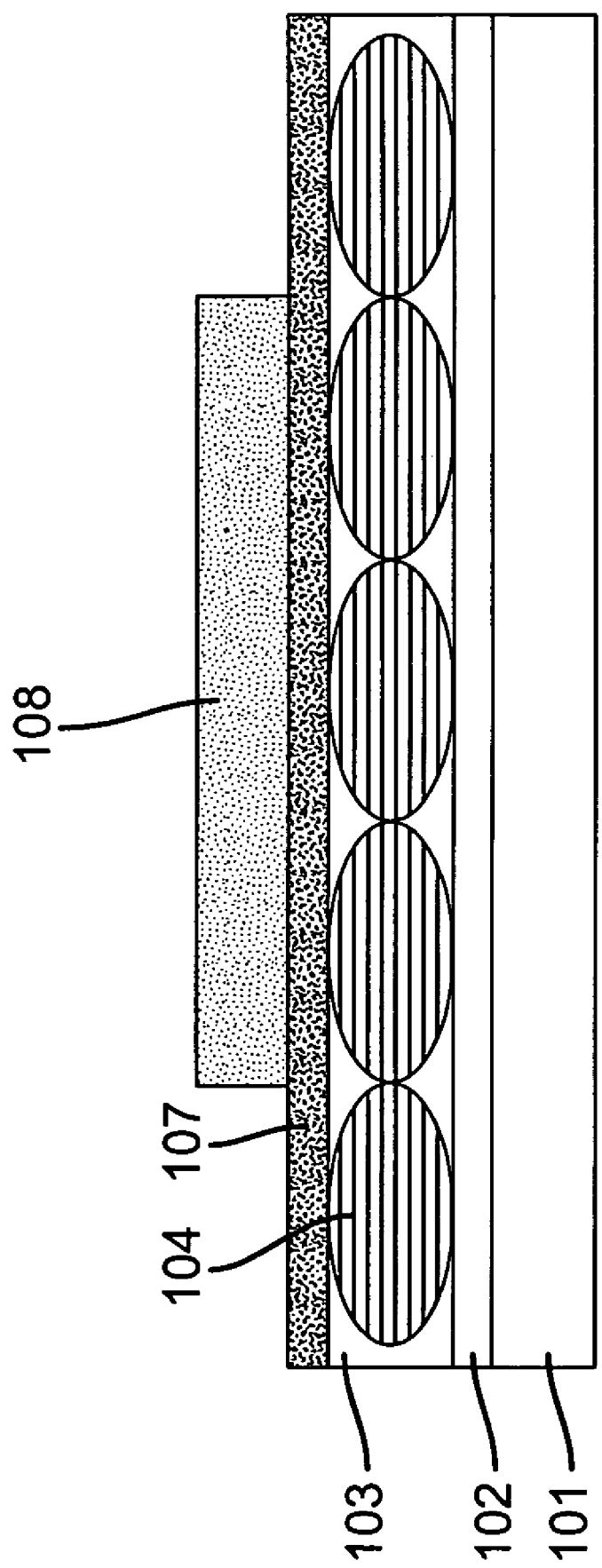
FIG. 7 illustrates a display based on a second embodiment of the invention.

A second preferred embodiment of the display device, shown in FIG. 7, comprises a clear flexible support 101 with a clear conducting layer 102. The imaging layer or light modulating layer (layer 1) contains a close-packed monolayer of droplets of the light modulating material 104 along with crosslinked binder 103 in a random coil configuration. A protective overcoat 107 is composed of polymer in a helix configuration and dispersed carbon black for improved contrast. The second electrode 108 comprises screen printed silver conductive ink.

In addition to binder and hardener, liquid crystal layers may also contain a small amount of light absorbing colorant, preferably an absorber dye. It is preferred that an absorbing dye is used to selectively absorb back scattered light from the focal conic state at the lowest wavelengths in the visible part of the spectrum. Further, the colorant selectively absorbs similarly scattered light from the planar state, while only minimally absorbing the main body of reflected light. The colorants may include both dyes and pigments. The colorant may absorb light components, which may cause turbidity of color in the color display performed by selective reflection of the liquid crystal or may cause lowering of a transparency in the transparent state of the liquid crystal, and therefore can improve the display quality. Two or more of the components in the liquid crystal display may contain a coloring agent. For example, both the polymer and the liquid crystal may contain the coloring agent. Preferably, a colorant is selected, which absorbs rays in a range of shorter wavelengths than the selective reflection wavelength of the liquid crystal.

Any amount of colorant may be used, provided that addition of the colorant does not remarkably impair the switching characteristics of the liquid crystal material for display. In addition, if the polymeric binder is formed by polymerization, the addition does not inhibit the polymerization. An exemplary amount of colorant is from at least 0.1 weight % to 5 weight % of the liquid crystal material.

In a preferred embodiment, the colorants, preferably absorber dyes, are incorporated directly in the chiral nematic liquid crystal materials. Any colorants that are miscible with the cholesteric liquid crystal materials are useful for this purpose. Most preferred are colorants that are readily soluble in toluene. By readily soluble is meant a solubility greater than 1 gram per liter, more preferably greater than 10 grams per liter and most preferably greater than 100 grams per liter. Toluene soluble dyes most compatible with the cholesteric liquid crystal materials are anthraquinone dyes such as Sandoplast Blue 2B from Clariant Corporation, phthalocyanine dyes such as Savinyl Blue GLS from Clariant Corporation or Neozapon Blue 807 from BASF Corporation, methine dyes such as Sandoplast Yellow 3G from Clariant Corporation or metal complex dyes such as Neozapon Yellow 157, Neozapon Orange 251, Neozapon Green 975, Neozapon Blue 807 or Neozapon Red 365 from BASF Corporation. Other colorants are Neopen Blue 808, Neopen Yellow 075, Sudan Orange 220 or Sudan Blue 670 from BASF Corporation. Other types of colorants may include various kinds of dyestuff such as dyestuff for resin coloring and dichromatic dyestuff for liquid crystal display. The dyestuff for resin coloring may be SPR RED1 (manufactured by Mitsui Toatsu Senryo Co., Ltd.). The dichromatic dyestuff for liquid crystal is specifically SI-424 or M-483 (both manufactured by Mitsui Toatsu Senryo Co., Ltd.).

Another aspect of the present invention relates to a display sheet comprising a substrate, an electrically conductive layer formed over the substrate, and a liquid crystal containing imaging layer comprising a chiral nematic material formed by the above described methods disposed over the electrically conductive layer.

As used herein, the phrase a "liquid crystal display" (LCD) is a type of flat panel display used in various electronic devices. At a minimum, a LCD comprises a substrate, at least one conductive layer and a liquid crystal layer. LCDs may also comprise two sheets of polarizing material with a liquid crystal solution between the polarizing sheets. The sheets of polarizing material may comprise a substrate of glass or transparent plastic. The LCD may also include functional layers. In one embodiment of a LCD, a transparent, multilayer flexible support is coated with a first conductive layer, which may be patterned, onto which is coated the light modulating liquid crystal layer. A second conductive layer is applied and overcoated with a dielectric layer to which dielectric conductive row contacts are attached, including via holes that permit interconnection between conductive layers and the dielectric conductive row contacts. An optional nanopigmented functional layer may be applied between the liquid crystal layer and the second conductive layer.

The liquid crystal (LC) is used as an optical switch. The substrates are usually manufactured with transparent, conductive electrodes, in which electrical "driving" signals are coupled. The driving signals induce an electric field which can cause a phase change or state change in the liquid crystal material, thus exhibiting different light reflecting characteristics according to its phase and/or state.

Figure 8:
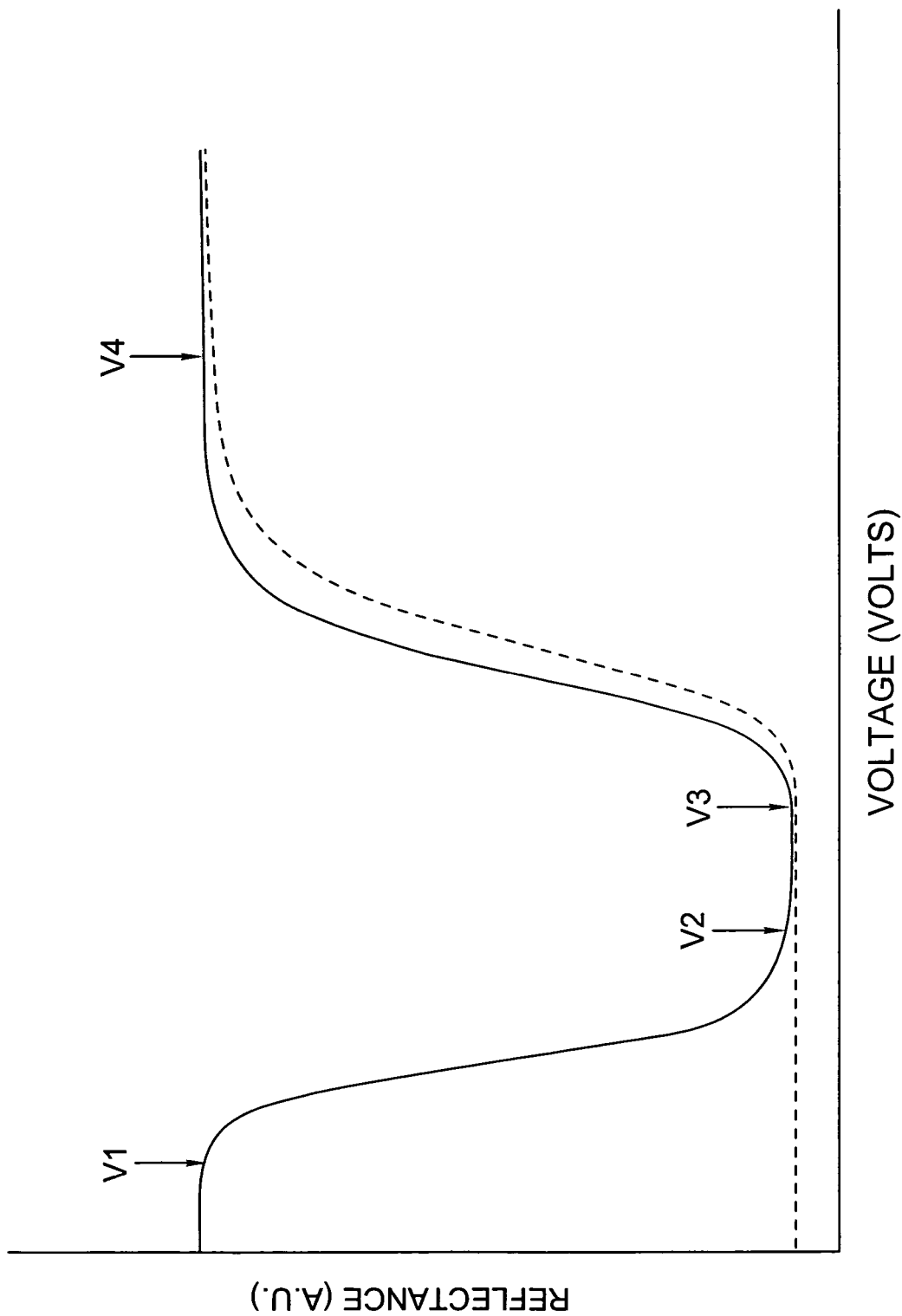
FIG. 8 illustrates a typical response of a bistable cholesteric or chiral nematic liquid crystal material to voltage pulses.

Cholesteric liquid crystals are bistable at zero field and drive schemes may be designed based on their response to voltage pulses. A typical response of a bistable cholesteric or chiral nematic liquid crystal material to voltage pulses is shown in FIG. 8. The horizontal axis represents the amplitude of the addressing voltage pulse and the vertical axis represents the reflectance measured after the liquid crystal relaxes to the stable state following application of the voltage pulse. The solid line is the response, when the material is initially in the planar state or texture, and the dashed line is the response, when the material is initially in the focal conic texture. In the conventional drive scheme for bistable cholesteric displays, the displays are addressed row by row. With reference to FIG. 8, if the row voltage VR is set at VR=(V3+V4)/2, then the column voltage VC has to be within the range V4−VR<VC<V1 for all columns in order to derive maximum contrast without cross-talk in a matrix or multiplexed display. By without cross-talk, it is meant that the portion of the image that has already been written on a multi-row display device will not be altered when a new row is selected and addressed. From the above relationships, it follows that for maximum contrast without cross-talk, (V4−V3)/2<V1. If we define a quantity Vqm=2V1/(V4−V3), it is clearly desirable that Vqm is greater than or at least equal to 1.

The displays may employ any suitable driving schemes and electronics known to those skilled in the art, including the following, all of which are incorporated herein by reference in their entireties: Doane, J. W., Yang, D. K., *Front-lit Flat Panel Display from Polymer Stabilized Cholesteric Textures*, Japan Display 92, Hiroshima October 1992; Yang, D. K. and Doane, J. W., *Cholesteric Liquid Crystal/Polymer Gel Dispersion: Reflective Display Application*, SID Technical Paper Digest, Vol XXIII, May 1992, p. 759, et sea.; U.S. patent application Ser. No. 08/390,068, filed Feb. 17, 1995, entitled "Dynamic Drive Method and Apparatus for a Bistable Liquid Crystal Display" and U.S. Pat. No. 5,453,863.

A typical display in its simplest form comprises a sheet supporting a conventional polymer dispersed electrically modulated material. The sheet includes a substrate. Substrate can be made of a polymeric material, such as Kodak Estar film base formed of polyester plastic, and have a thickness of between 20 and 200 microns. For example, substrate can be a 80 micron thick sheet of transparent polyester. Other polymers, such as transparent polycarbonate, can also be used. Alternatively, substrate can be thin, transparent glass.

A first conductor is formed over substrate. First conductor can be a transparent, electrically conductive layer of tin-oxide or indium-tin-oxide (ITO), with ITO being the preferred material. Typically, first conductor is sputtered onto the substrate to a resistance of less than 250 ohms per square. Alternatively, first conductor can be an opaque electrical conductor formed of metal such as copper, aluminum or nickel. If first conductor is an opaque metal, the metal can be a metal oxide to create a light absorbing first conductor. A second conductor may be applied to the surface of light modulating imaging layer. Second conductor should have sufficient conductivity to carry a field across light modulating imaging layer. Second conductor can be formed in a vacuum environment using materials such as aluminum, tin, silver, platinum, carbon, tungsten, molybdenum, or indium.

In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

In a typical matrix-addressable light emitting display device, numerous light emitting devices are formed on a single substrate and arranged in groups in a regular grid pattern. Activation may be by rows and columns, or in an active matrix with individual cathode and anode paths. OLEDs are often manufactured by first depositing a transparent electrode on the substrate, and patterning the same into electrode portions. The organic layer(s) is then deposited over the transparent electrode. A metallic electrode can be formed over the electrode layers. For example, in U.S. Pat. No. 5,703,436 to Forrest et al., incorporated herein by reference, transparent indium tin oxide (ITO) is used as the Hole injecting electrode, and a Mg—Ag-ITO electrode layer is used for electron injection.

The flexible plastic substrate can be any flexible self-supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post manufacturing conditions such as in a process line of a displays manufacturer. Certain of the plastic substrates discussed below can withstand higher processing temperatures of up to at least about 200° C., some up to 300-350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl(x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene) fluoropolymer (PETFE), and poly(methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan, Zeanor T made by Zeon Chemicals L.P., Tokyo Japan, and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec". Lintec contains UV cured polyester acrylate and colloidal silica. When deposited on Arton, it has a surface composition of 35 atom % C, 45 atom % 0, and 20 atom % Si, excluding hydrogen. Another particularly preferred hard coating is the acrylic coating sold under the trademark "Terrapin" by Tekra Corporation, New Berlin, Wis.

The LCD contains at least one conductive layer, which typically is comprised of a primary metal oxide. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.) Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The conductive layer may be formed, for example, by a low temperature sputtering technique or by a direct current sputtering technique, such as DC sputtering or RF-DC sputtering, depending upon the material or materials of the underlying layer. The conductive layer may be a transparent, electrically conductive layer of tin oxide or indium tin oxide (ITO), or polythiophene (PDOT). Typically, the conductive layer is sputtered onto the substrate to a resistance of less than 250 ohms per square. Alternatively, conductive layer may be an opaque electrical conductor formed of metal such as copper, aluminum or nickel. If the conductive layer is an opaque metal, the metal can be a metal oxide to create a light absorbing conductive layer.

The material is coated over patterned ITO first conductors to provide a polymer dispersed cholesteric coating having a dried thickness of less than 50 microns, preferably less than 25 microns, more preferably less than 15 microns, most preferably less than about 10 microns.

Indium tin oxide (ITO) is the preferred conductive material, as it is a cost effective conductor with good environmental stability, up to 90% transmission, and down to 20 ohms per square resistivity. An exemplary preferred ITO layer has a % T greater than or equal to 80% in the visible region of light, that is, from greater than 400 nm to 700 nm, so that the film will be useful for display applications. In a preferred embodiment, the conductive layer comprises a layer of low temperature ITO, which is polycrystalline. The ITO layer is preferably 10-120 nm in thickness, or 50-100 nm thick to achieve a resistivity of 20-60 ohms/square on plastic. An exemplary preferred ITO layer is 60-80 nm thick.

The conductive layer is preferably patterned. The conductive layer is preferably patterned into a plurality of electrodes. The patterned electrodes may be used to form a LCD device. In another embodiment, two conductive substrates are positioned facing each other and cholesteric liquid crystals are positioned there between to form a device. The patterned ITO conductive layer may have a variety of dimensions. Exemplary dimensions may include line widths of 10 microns, distances between lines, that is, electrode widths, of 200 microns, depth of cut, that is, thickness of ITO conductor, of 100 nanometers. ITO thicknesses on the order of 60, 70, and greater than 100 nanometers are also possible.

The display may also contain a second conductive layer applied to the surface of the light modulating layer. The second conductive layer desirably has sufficient conductivity to carry a field across the light modulating layer. The second conductive layer may be formed in a vacuum environment using materials such as aluminum, tin, silver, platinum, carbon, tungsten, molybdenum, or indium. Oxides of these metals can be used to darken patternable conductive layers. The metal material can be excited by energy from resistance heating, cathodic arc, electron beam, sputtering or magnetron excitation. The second conductive layer may comprise coatings of tin oxide or indium tin oxide, resulting in the layer being transparent. Alternatively, second conductive layer may be printed conductive ink.

For higher conductivities, the second conductive layer may comprise a silver based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the conductive layer comprises at least one of gold, silver and a gold/silver alloy, for example, a layer of silver coated on one or both sides with a thinner layer of gold. See, Int. Publ. No. WO 99/36261 by Polaroid Corporation. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference.

The second conductive layer may be patterned irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference.

In a preferred embodiment, second conductors are printed conductive ink such as ELECTRODAG 423SS screen printable electrical conductive material from Acheson Corporation. Such printed materials are finely divided graphite particles in a thermoplastic resin. The second conductors are formed using printed inks to reduce display cost. The use of a flexible support for substrate layer, laser etched first conductors, machine coating polymer dispersed cholesteric layer, and printing second conductors permit the fabrication of very low cost memory displays. Small displays formed using these methods can be used as electronically rewritable transaction cards for inexpensive, limited rewrite applications.

A light absorbing second conductor may be positioned on the side opposing the incident light. In the fully evolved focal conic state the cholesteric liquid crystal is transparent, passing incident light, which is absorbed by second conductor to provide a black image. Progressive evolution to the focal conic state causes a viewer to see an initial bright reflected light that transitions to black as the cholesteric material changes from planar state to a fully evolved focal conic state. The transition to the light transmitting state is progressive, and varying the low voltage time permits variable levels of reflection. These variable levels can be mapped out to corresponding gray levels, and when the field is removed, light modulating layer maintains a given optical state indefinitely. The states are more fully discussed in U.S. Pat. No. 5,437,811.

In addition to a second conductive layer, other means may be used to produce a field capable of switching the state of the liquid crystal layer as described in, for example, U.S. Pat Appl. Nos. 20010008582 A1, 20030227441 A1, 20010006389 A1, and U.S. Pat. Nos. 6,424,387, 6,269,225, and 6,104,448, all incorporated herein by reference.

The LCD may also comprise at least one "functional layer" between the conductive layer and the substrate. The functional layer may comprise a protective layer or a barrier layer. The protective layer useful in the practice of the invention can be applied in any of a number of well known techniques, such as dip coating, rod coating, blade coating, air knife coating, gravure coating and reverse roll coating, extrusion coating, slide coating, curtain coating, and the like. The liquid crystal particles and the binder are preferably mixed together in a liquid medium to form a coating composition. The liquid medium may be a medium such as water or other aqueous solutions in which the hydrophilic colloid are dispersed with or without the presence of surfactants. A preferred barrier layer may acts as a gas barrier or a moisture barrier and may comprise $SiO_x$, $AlO_x$ or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. In another embodiment of this invention, the antistatic layer has a surface resistivity of between $10^5$ to $10^{12}$ ohms. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

Another type of functional layer may be a color contrast layer. Color contrast layers may be radiation reflective layers or radiation absorbing layers. In some cases, the rearmost substrate of each display may preferably be a color contrast layer. The rearmost substrate may also preferably be painted black. The color contrast layer may also be other colors. In another embodiment, the dark layer comprises milled non-conductive pigments. The materials are milled below 1 micron to form "nanopigments". In a preferred embodiment, the dark layer absorbs all wavelengths of light across the visible light spectrum, that is from 400 nanometers to 700 nanometers wavelength. The dark layer may also contain a set or multiple pigment dispersions. Suitable pigments used in the color contrast layer may be any colored materials, which are practically insoluble in the medium in which they are incorporated. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolo-pyrrole, and thioindigo, and anthriquinone pigments such as anthrapyrimidine.

The functional layer may also comprise a dielectric material. A dielectric layer, for purposes of the present invention, is a layer that is not conductive or blocks the flow of electricity. This dielectric material may include a UV curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged. The dielectric material may form an adhesive layer to subsequently bond a second electrode to the light modulating layer.

The liquid crystal containing composition of the invention can be applied by any of a number of well known techniques, such as dip coating, rod coating, blade coating, air knife coating, slide (or bead) coating, curtain coating, and the like.

After coating, the layer is generally dried by simple evaporation, which may be accelerated by known techniques such as convection heating. Known coating and drying methods are described in further detail in Research Disclosure No. 308119, Published December 1989, pages 1007 to 1008. The coating is maintained above the chill set temperature or sol-gel transition temperature of gelatin during drying of the imaging layer or light modulating layer to permit self-assembly of the droplets into a close-packed monolayer.

A coated sheet can be formed using inexpensive, efficient layering methods. A single large volume of sheet material can be coated and formed into various types of smaller sheets for use in display devices such as transaction cards, shelf labels, large format signage, and the like. Displays in the form of sheets in accordance with the present invention are inexpensive, simple, and fabricated using low cost processes.

In the preferred embodiment, the imaging layer or light modulating layer is first applied and maintained above the chill set temperature or sol-gel transition temperature of gelatin. After drying, the binder in this layer is allowed to crosslink to preserve the close-packed monolayer distribution of coated droplets. A second aqueous layer containing gelatin is then applied. The coating is chill set prior to drying of the second layer in order to allow the gelatin molecules in the second layer to adopt a helix structure In a preferred commercial embodiment, the substrate to be coated is in the form of a moving web. After completing the manufacture of a coated liquid crystal sheet material between spaced electrodes, the sheet material can be cut into a plurality of smaller, individual areas for use in various display or other applications.

A close-packed monolayer of uniform thickness may provide enhanced performance with respect to surface roughness. In conventional liquid crystal coatings containing non-uniform droplets or capsules, the root mean square (RMS) surface roughness has been measured at about 6 microns. This is a very high value of surface roughness that would result in irregular or incomplete curing if a UV curable screen printed conducive ink is used as the second electrode. The irregular curing will result in increased switching voltages. Furthermore, a surface roughness of this magnitude will also result in significant non-uniformity of switching voltage across the area of the display since the switching voltage is directly related to the thickness of the coated layer. The self-assembled droplets or domains in the present close-packed monolayer demonstrates a RMS surface roughness of less than 1.5 microns, more preferably less than 1.0 microns and most preferably less than 0.5 microns.

The following examples are provided to illustrate the invention.

EXAMPLE 1

This example illustrates the close-packed ordered monolayer structure obtained according to the invention compared to the random structure of a control coating.

Chiral nematic liquid crystal (CLC) compositions with center wavelengths of reflection (CWR) at 540 nm and 590 nm were prepared by adding the appropriate amount of a high twist chiral dopant to the nematic host mixture BL087 obtained from Merck, Darmstadt, Germany. The CLC composition with CWR at 590 nm also contained 0.2% weight/weight (w/w) of the blue absorbing dye Neopen Yellow 057 from BASF Corporation.

Method 1 (Invention)

A dispersion of the CLC composition with CWR at 590 nm was prepared as follows. To 241 grams of distilled water was added 3.6 grams of Ludox™ colloidal silica suspension and 7.4 grams of a 10% w/w aqueous solution of a copolymer of methylaminoethanol and adipic acid. To this was added 108 grams of the CLC composition. The mixture was stirred using a Silverson mixer at 5000 rpm. It was then passed through a microfluidizer at 3000 psi. Finally, the resulting dispersion was passed through a 23 μm filter. The droplet size distribution in the dispersion was measured using a Coulter Counter. It was found that the mean size was 9.7 microns with a coefficient of variation (cv) of 0.14.

The above dispersion was mixed with an aqueous solution of fish skin gelatin from Norland Products Inc. having a weight-average molecular weight of 83,800 and a polydispersity of 3.4, an aqueous solution of polyvinylalcohol (PVA)(type GL-05 from Nippon Gohsei Limited), a solution of Aerosol OT in water and a solution of bis(vinylsulfonyl) methane in water to give a coating composition containing 15% w/w CLC material, 4.5% fish skin gelatin, 0.5% PVA, 0.07% Aerosol OT coating aid and 0.1% bis(vinylsulfonyl) methane crosslinker. The composition was spread over a plastic support with a thin layer of indium tin oxide (ITO) at 37.67 cm$^3$/m$^2$ to give a dry uniform coverage of about 5400 mg/m$^2$ of CLC material. The PVA prevented agglomeration of the liquid crystal domains during self-assembly and helped minimize defects in the coating. The plastic support (Dupont ST504) with a sputter coated ITO conductive layer (300 ohm/sq resistivity) was obtained from Bekaert. The thickness of the ITO layer is approximately 240 Angstroms. During the operation, the plastic support was placed over a coating block that was maintained at room temperature (23° C.) and the coating composition was also delivered or applied at the same temperature. The resulting coating was then dried under ambient conditions (23° C.). The fish gelatin does not chill set at room temperature and, thus, had not chill set at the onset of drying.

A sample of the dried coating was positioned facing a helium-neon laser (Spectra Physics model 155A). A screen was placed behind the sample. The distance from the source of laser light to the sample was 20.6 cm and the distance from the sample to the screen was 10.5 cm. As shown in FIG. 1, the invention coating showed diffraction rings on the screen caused by Fraunhofer diffraction of light indicating an ordered close-packed monolayer of CLC droplets in the coating.

Method 2 (Control)

A dispersion of the CLC composition with CWR at 540 nm was prepared as follows. To 172.1 grams of distilled water was added 2.6 grams of Ludox™ colloidal silica suspension and 5.3 grams of a 10% w/w aqueous solution of a copolymer of methylaminoethanol and adipic acid. To this was added 77.2 grams of the CLC composition. The mixture was stirred using a Silverson mixer at 5000 rpm. It was then passed through a microfluidizer at 3000 psi. Finally, the resulting dispersion was passed through a 23 μm filter. The droplet size distribution in the dispersion was measured using a Coulter Counter. It was found that the mean size was 9.4 microns with a coefficient of variation (cv) of 0.14.

The above dispersion was mixed with an aqueous solution of conventional Type IV cattle gelatin having a weight-average molecular weight of 229,000 and a polydispersity of 5.4, a solution of Alkanol XC in water and a solution bis(vinylsulfonyl)methane in water to give a coating composition containing 8% w/w CLC material, 5% gelatin, 1% Alkanol XC coating aid and 0.05% bis(vinylsulfonyl)methane crosslinker. The composition was then spread over a plastic support with a thin layer of indium tin oxide (ITO) to give a uniform coverage of about 5400 mg/m$^2$. The plastic support (Dupont ST504) with a sputter coated ITO conductive layer (300 ohm/sq resistivity) was obtained from Bekaert. The thickness of the ITO layer is approximately 240 Angstroms. During the operation, the coating block was maintained at a temperature close to room temperature (23° C.) and the coating composition was delivered or applied at a temperature of 45° C. The resulting coating was then dried under ambient conditions (23° C.). It should be noted that conventional gelatin will chill set at this temperature prior to the onset of drying since the sol-gel transition temperature of conventional gelatin is above room temperature.

Figure 2:
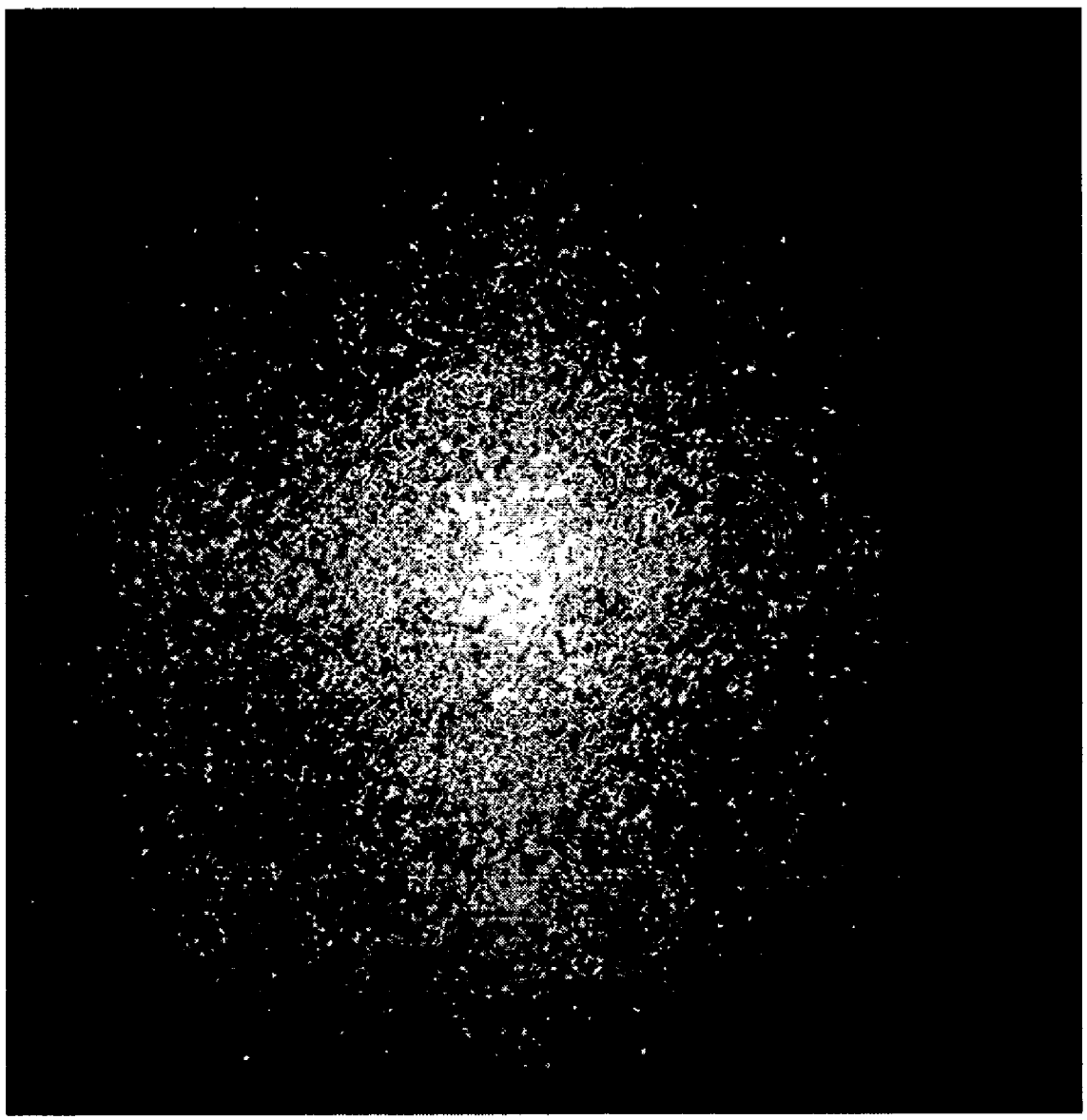
FIG. 2 represents the diffraction pattern by Fraunhofer diffraction of light indicating a very disordered coating of the CLC droplets, according to the prior art.

A sample of this coating was inspected using the same laser light source under the same conditions as before. As shown in FIG. 2, in this case the diffraction pattern is distinctly different, indicative of a very disordered or random coating of the CLC droplets.

EXAMPLE 2

This example illustrates the improved electro-optical properties of a device fabricated according to the invention compared to a control device.

Method I (Invention)

A dispersion of CLC material was prepared in a manner similar to Method I of Example 1.

The dispersion was mixed with an aqueous solution of Type IV cattle gelatin having a weight-average molecular weight of 117,000 and a polydispersity of 3.7, an aqueous solution of polyvinylalcohol (PVA)(type GL-05 from Nippon Gohsei Limited), a solution of Aerosol OT in water and a solution bis(vinylsulfonyl)methane in water to give a coating composition containing 15% w/w CLC material, 4.5% gelatin, 0.5% PVA, 0.07% Aerosol OT and 0.1% bis(vinylsulfonyl)methane. The composition was spread over a plastic support with a thin layer of indium tin oxide (ITO) to give a uniform coverage of about 5400 mg/m$^2$ of CLC material. The coated layer was referred to as layer 1. During the operation, the plastic support was placed over a coating block that was maintained at a temperature of 45° C. and the coating composition was also delivered or applied at the same temperature.

The resulting coating was then dried at 45° C. The coating was kept aside for 48 hours to allow the crosslinking of gelatin to go to completion. Analysis of a portion of the coating by laser light as in Example 1 showed rings due to Fraunhofer diffraction of light. Analysis of a second portion of the coating by x-ray diffraction showed a complete absence of triple helix structure in gelatin. In other words, the gelatin molecules in layer 1 were in a random coil configuration. The coating was then placed on a coating block that was maintained at 23° C. A 4% w/w solution of Type IV cattle gelatin was then coated over layer 1 at a uniform wet coverage of about 28 cm$^3$/m$^2$. This second layer was referred to as layer 2. The coating was then dried at room temperature (23° C.).

Analysis of a portion of the coating by x-ray diffraction now showed a peak at low angle associated with the triple helix structure of gelatin indicating that at least some of the gelatin molecules in layer 2 were in the triple helix configuration. Analysis by laser light showed that the close-packed structure had been preserved even after the second layer had been applied. A carbon-based conductive ink (Electrodag 423SS from Acheson Corporation) was then screen printed on top of layer 2 to complete the construction of the display device.

Figure 3:
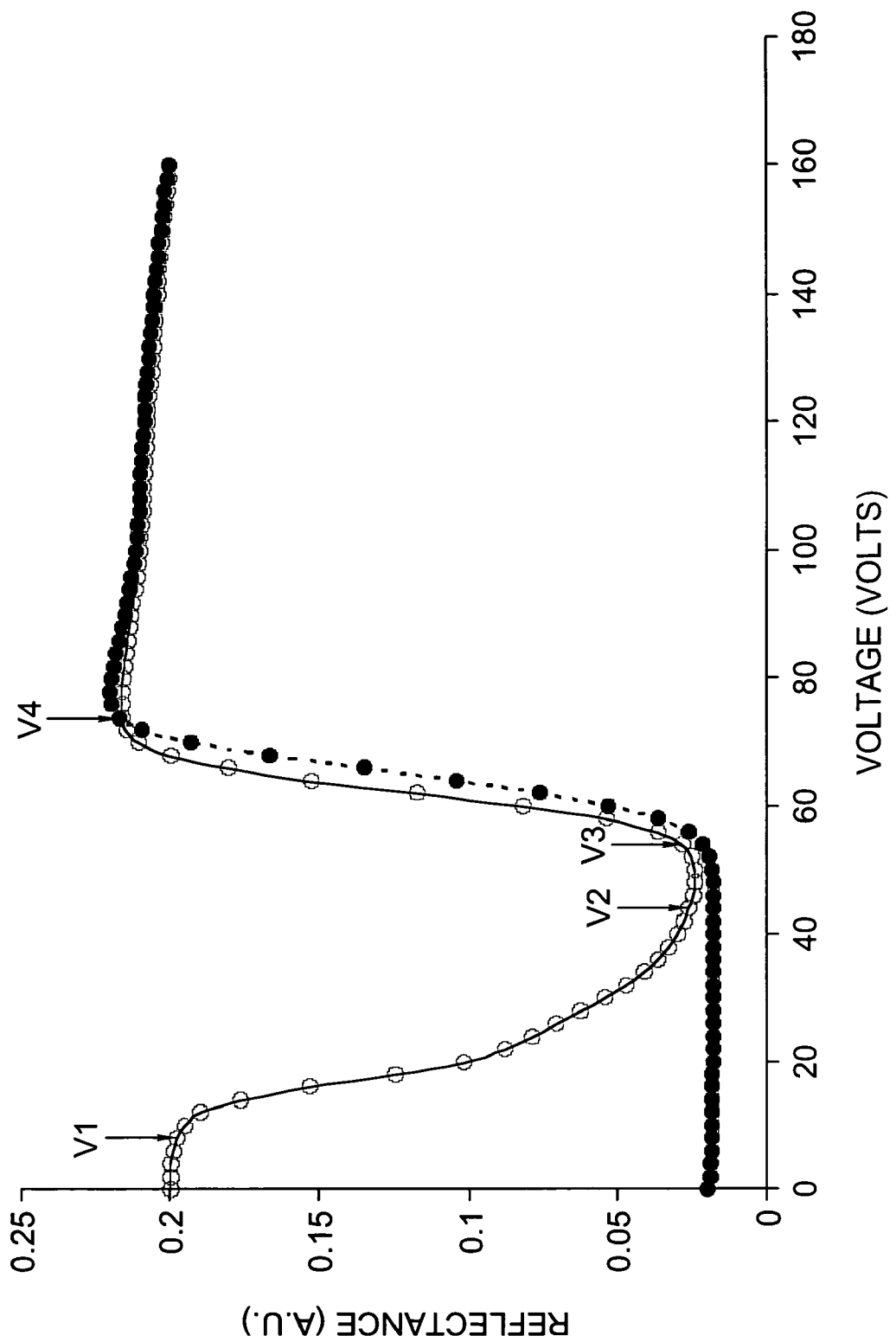
FIG. 3 illustrates the electro-optic response of a display device based on one embodiment of the method of the invention.

The electro-optic response of the device is shown in FIG. 3. The horizontal axis is the amplitude of the addressing voltage pulse and the vertical axis is the reflectance of the CLC material measured at 0 volts about 2 seconds after application of the addressing pulse. The reflectance was measured using an X-rite 938 spectrodensitometer. The addressing pulse was a square wave with frequency of 250 Hz and duration of 100 milliseconds. The open circles represent the response when the material was initially in the planar texture and the filled circles represent the response when the material was initially in the focal conic state. A voltage pulse higher than 70 volts (V4) switched the display into the reflecting state and a voltage pulse between 44 and 54 volts (V2 and V3 respectively) switched the display into the weakly scattering or dark state. Voltages less than V1 (8 volts) did not influence the state of the display. In this case the quantity Vqm, defined as 2V1/(V4−V3), was equal to 1. For a multi-row and column matrix display using conventional drive it is important that Vqm is greater than or equal to 1 to ensure maximum contrast without cross-talk.

Method 2 (Control)

Figure 4:
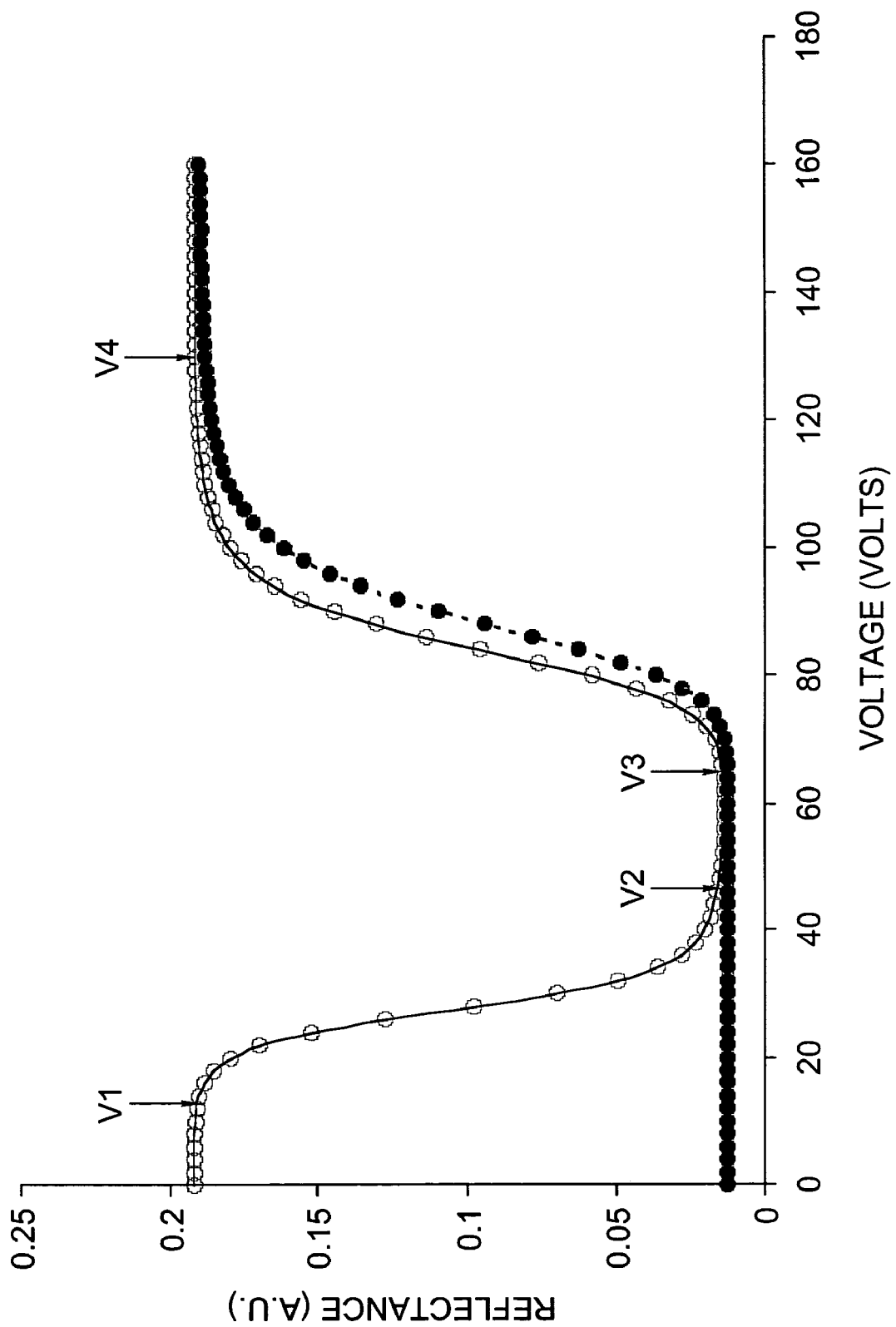
FIG. 4 illustrates the electro-optic response of a display device based on the method of the prior art.

A dispersion of CLC material and coating composition were prepared in a manner similar to Method 2 of Example 1. The composition was coated as described under Method 2 of Example 1. A carbon-based conductive ink (Electrodag 423SS from Acheson Corporation) was then screen printed on top of the coating to create the display device. The electro-optic response of the device is shown in FIG. 4. In this case, a voltage pulse higher than 130 volts (V4) switched the display into the reflecting (bright) state and a voltage pulse between 44 and 64 volts (V2 and V3 espectively) switched the display into the weakly scattering or dark state. The contrast ratio defined as the reflectance of the bright state divided by that of the dark state was 15.8. Voltages less than 14 volts (V1) did not influence the state of the display. Based on these parameters Vqm was only 0.42.

It is clear that the voltage needed to switch the display into the reflecting state was significantly greater than that of the invention device. Furthermore, the contrast of a multiplexed display based on this method may be greatly inferior compared to the method of the invention because of the relatively low value of Vqm.

EXAMPLE 3

Invention

A dispersion of CLC material and coating composition were prepared as described under Method 1 of Example 1. The composition was spread over a plastic support (Dupont ST504) with a thin layer of ITO (approximately 240 Angstroms in thickness and 300 ohm/sq resistivity) at 37.7 cm$^3$/m$^2$ to give a uniform dry coverage of about 5400 mg/m$^2$ for the CLC material. During the operation, the plastic support was placed over a coating block that was maintained at 45 C and the coating composition was delivered at 23 C.

The resulting coating of the imaging layer was dried at 45 C. All of these temperatures were above the sol-gel transition temperature of the binder.

Figure 5:
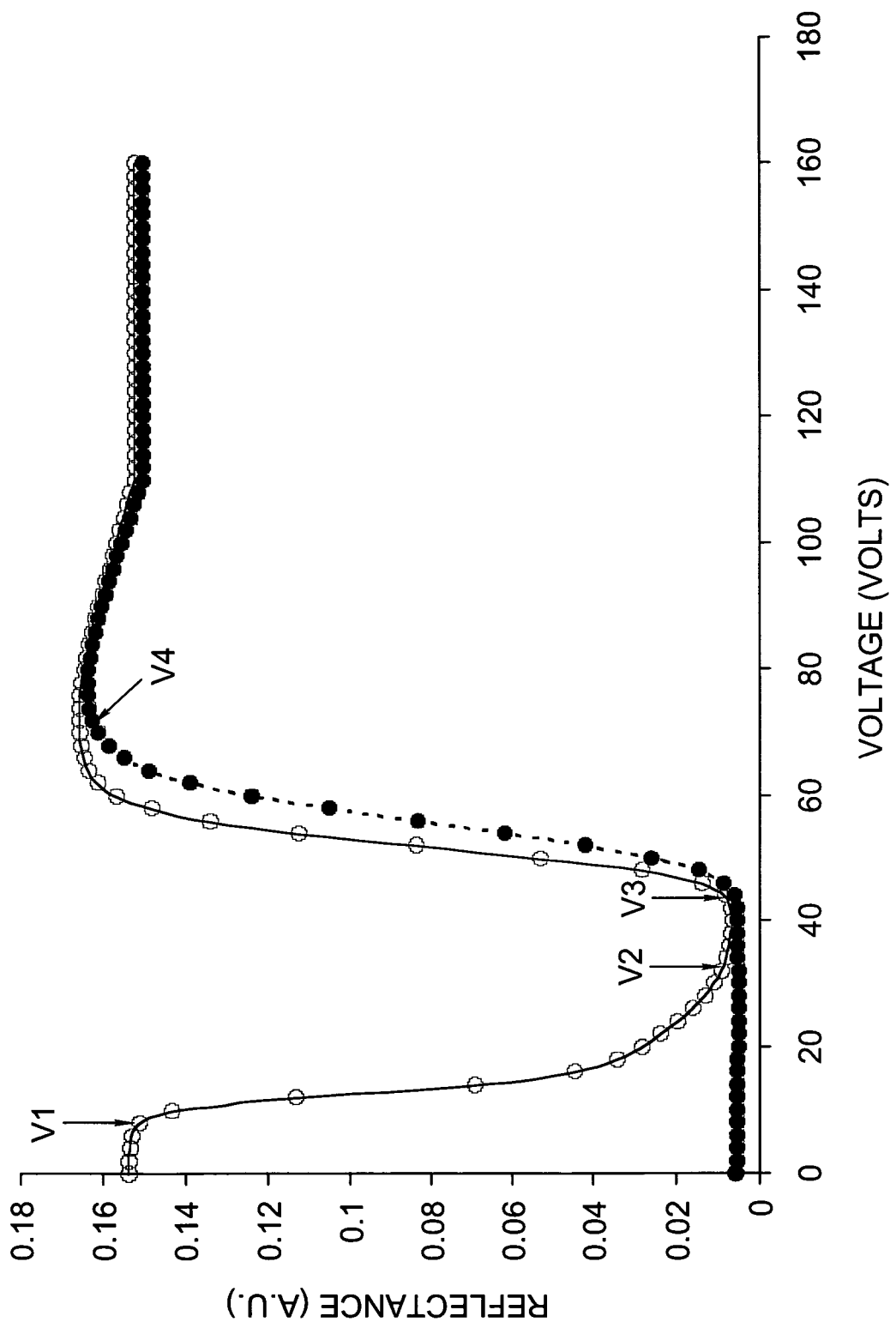
FIG. 5 illustrates the electro-optic response of a display device based on a second embodiment of the method of the invention.

The coating of the imaging layer was kept aside for 48 h to allow the cross-linking of gelatin to go to completion. The coating was then placed on a coating block that was maintained at 30 C. A composition containing 4% Type IV cattle gelatin, 1.4% carbon black and 0.1% Aerosol OT in distilled water was then spread over it using a coating knife with 0.008 cm gap to constitute the protective overcoat. The coating was dried at 30 C. For this top layer or protective overcoat, the temperature of the coating block and the drying temperature were both below the sol-gel transition temperature of the binder. A silver-based conducting ink was then screen printed over the dried protective layer to complete construction of the display device. The electro-optic response of this device is shown in FIG. 5. A voltage pulse higher than 72 volts (V4) switched the display into the reflecting state and a voltage pulse between 32 and 44 volts (V2 and V3 respectively) switched the display into the weakly scattering or dark state. The contrast ratio was 33.1.

It is clear that the voltages needed to switch the display into the bright state and the dark state were considerably lower than those for the control.

Furthermore, the contrast ratio was significantly higher indicating a much improved display at low voltage.

EXAMPLE 4

Invention

This example illustrates the uniformity of thickness of the imaging layer using the method of the invention. It is preferred that the RMS surface roughness is less than 1.5 microns, it is more preferred that the RMS surface roughness is less than 1.0 microns and it is most preferred that the RMS surface roughness is less than 0.5 microns. (reasons for the uniformity of thickness are in the prior art section).

A dispersion of CLC material and coating composition were prepared as described under Method 1 of Example 1. The composition was spread over a plastic support (Dupont ST504) with a thin layer of ITO (approximately 240 Angstroms in thickness and 300 ohm/sq resistivity) at 37.7 $cm^3/m^2$ to give a uniform dry coverage of about 5400 $mg/m^2$ for the CLC material. During the operation, the plastic support was placed over a coating block that was maintained at 45 C and the coating composition was delivered at 23 C. The resulting coating of the imaging layer was dried at 45 C. All of these temperatures were above the sol-gel transition temperature of the binder.

Figure 9:
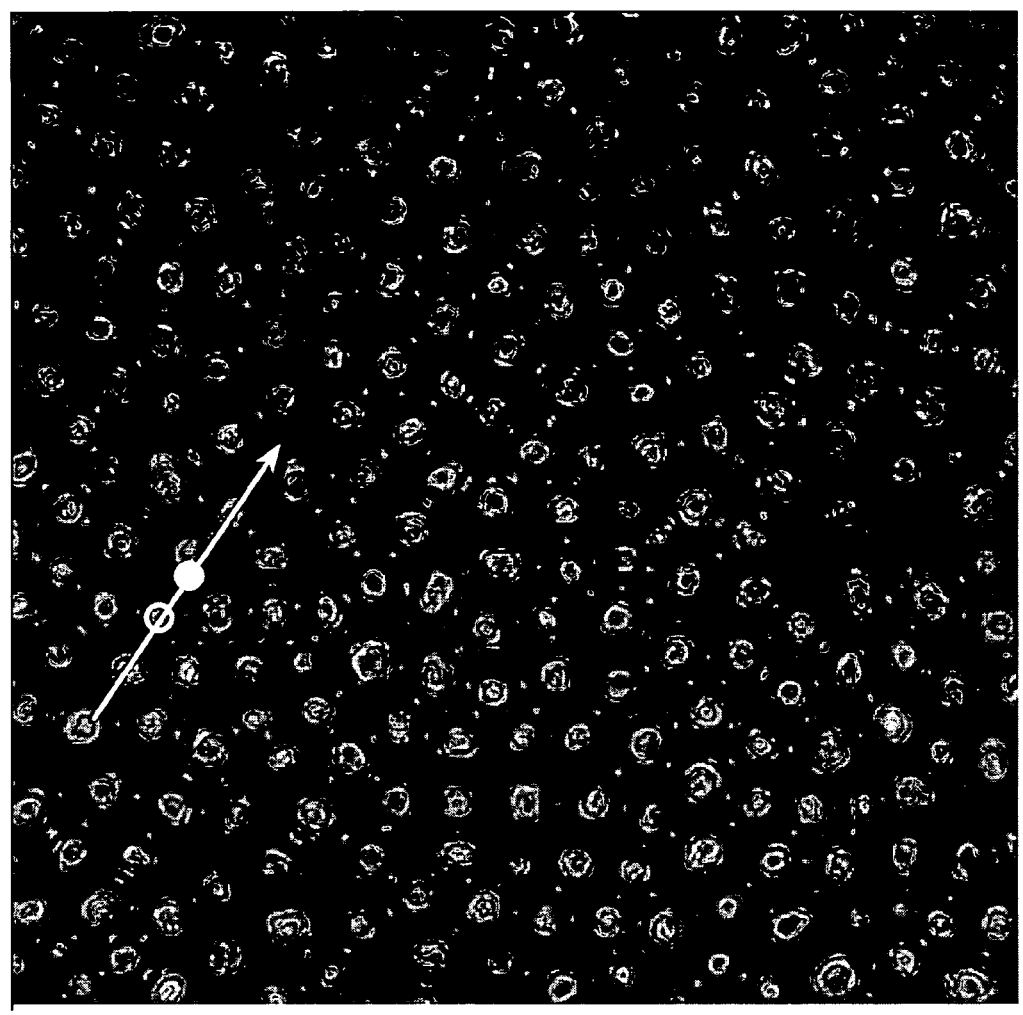
FIG. 9 illustrates the uniformity of the surface of the coated layer of the light modulating component prepared according to the method of the invention.
Figure 9:
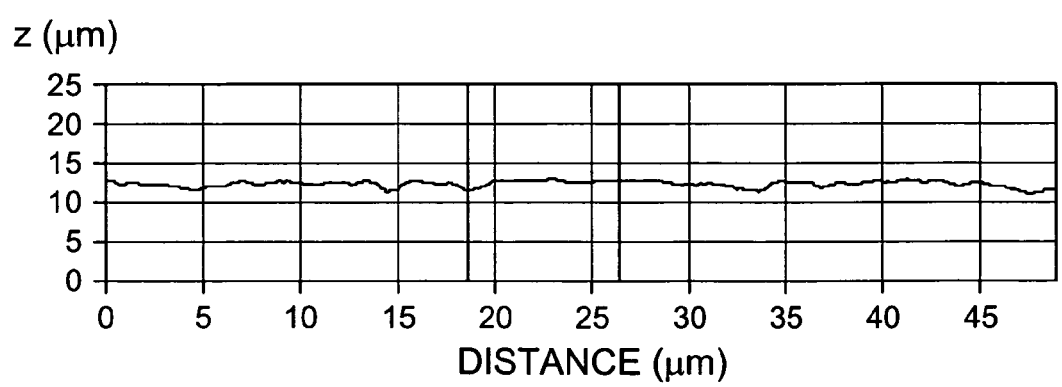

The coating of the imaging layer was kept aside for 48 hours to allow the crosslinking of gelatin to go to completion. The surface roughness profile was then obtained using a Zeiss LSM 510 laser scanning microscope from Carl Zeiss Microimaging Inc., One Zeiss Drive, Thornwood N.Y. 10594. FIG. 9 shows a micrograph of the coating of the imaging layer along with the surface roughness profile. The roughness profile shows the variation in thickness as a function of distance along a line drawn across the surface of the coating. From such a profile it is possible to calculate the root mean square (RMS) surface roughness (see for example Wyko NT8000 Set Up and Operation Guide June 2003 version 3.01 Veeco Industries Inc. 2650 East Elvira Road, Tuscon Ariz. 85706). For this coating the RMS surface roughness was about 0.4 microns.

Figure 10:
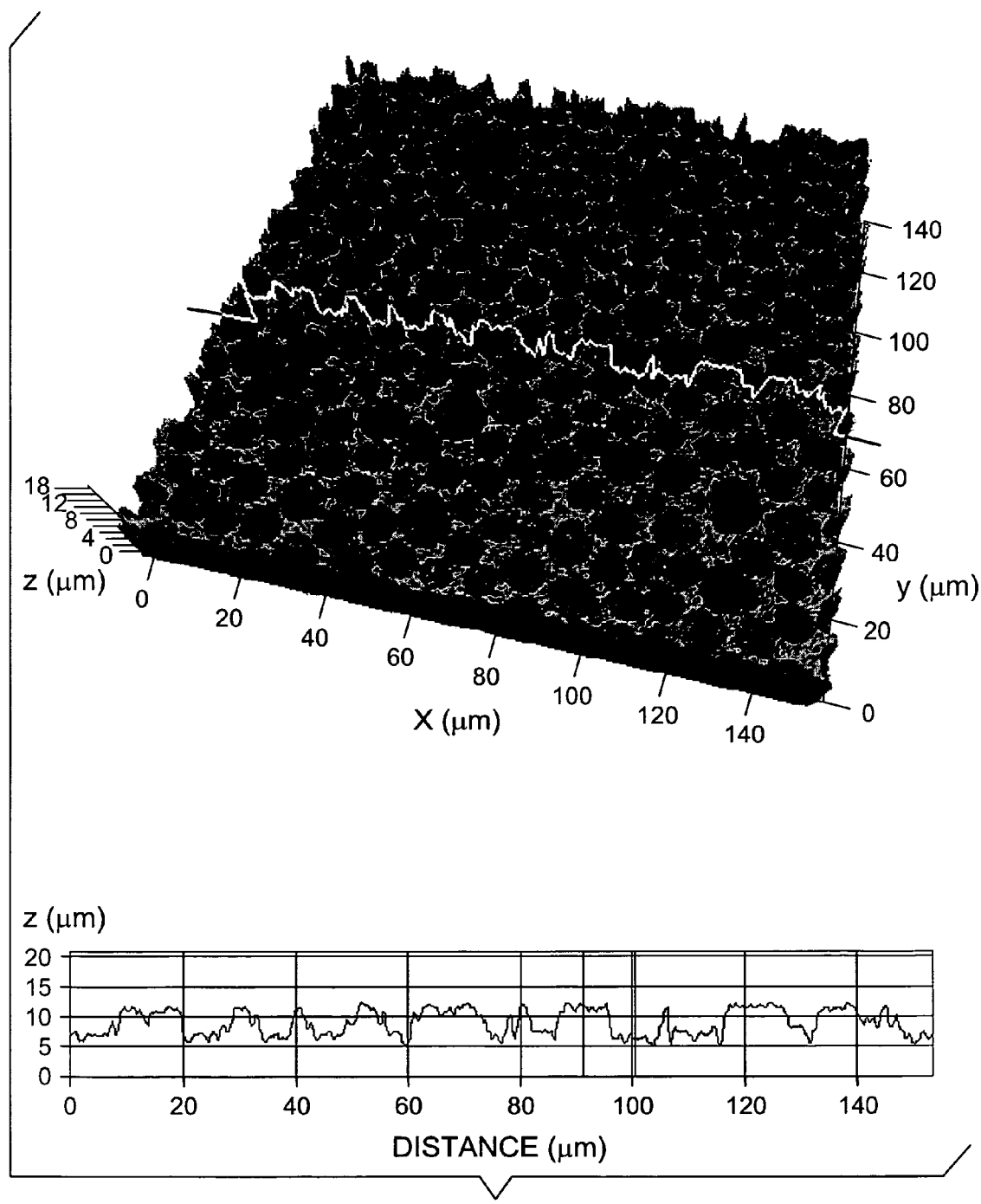
FIG. 10 illustrates fixing the architecture of the coated layer of the light modulating component of uniform thickness according to the method of the invention.

The coating was then immersed in acetone to remove the liquid crystal material. After removal of the liquid crystal material, the coating was once again examined using the laser confocal microscope. The corresponding micrograph is shown in FIG. 10. The coating now shows well-defined cavities in areas that were originally occupied by droplets of the liquid crystal. Note that the crosslinked binder resisted dissolution. In other words, cross-linking the binder allowed the close-packed structure to be fixed or locked into place. The attached profile shows that the imaging layer had a uniform thickness of about 5 microns.

EXAMPLE 5

Control

This example illustrates the effect of using a polymer latex as the binder material in the imaging layer instead of gelatin.

A CLC composition with CWR at 450 nm was prepared by adding the appropriate amount of a high twist chiral dopant to the nematic host mixture BL087 obtained from Merck, Darmstadt, Germany.

A dispersion of the CLC composition with CWR at 450 nm was prepared as follows. To 166 grams of distilled water was added 2.6 grams of Ludox™ colloidal silica suspension and 5.1 grams of a 10% w/w aqueous solution of a copolymer of methylaminoethanol and adipic acid. To this was added 74.6 grams of the CLC composition. The mixture was stirred using a Silverson mixer at 5000 rpm. It was then passed through a microfluidizer at 3000 psi. Finally, the resulting dispersion was passed through a 23 µm filter. The droplet size distribution in the dispersion was measured using a Coulter Counter. It was found that the mean size was 9.4 microns with a coefficient of variation (cv) of 0.14.

The above dispersion was mixed with an aqueous suspension of polyurethane polymer latex NeoRez R-967 from NeoResins, Wilmington Mass., USA and a solution of coating aid Olin 10 G in water to give a coating composition containing 15% w/w CLC material, 5.0% polymer latex and 0.1% Olin 10 G. The composition was spread over a plastic support with a thin layer of indium tin oxide (ITO) using a coating knife with 0.008 cm gap. The plastic support (Dupont ST504) with a sputter coated ITO conductive layer (300 ohm/sq resistivity) was obtained from Bekaert. The thickness of the ITO layer is approximately 240 Angstroms. During the operation, the plastic support was placed over a coating block that was maintained at room temperature (23° C.) and the coating composition was also delivered or applied at the same temperature. The resulting coating was then dried under ambient conditions (23° C.). The coating was then placed on a coating block that was maintained at 23 C. A composition containing 4% Type IV cattle gelatin and 0.1% Aerosol OT in distilled water was then spread over it using a coating knife with 0.008 cm gap to constitute the protective overcoat. The coating was dried at 23 C. For this top layer or protective overcoat, the temperature of the coating block and the drying temperature were both below the sol-gel transition temperature of the binder. A carbon-based conductive ink (Electrodag 423SS from Acheson Corporation) was then screen printed over the protective overcoat to complete the construction of the display device.

Figure 11:
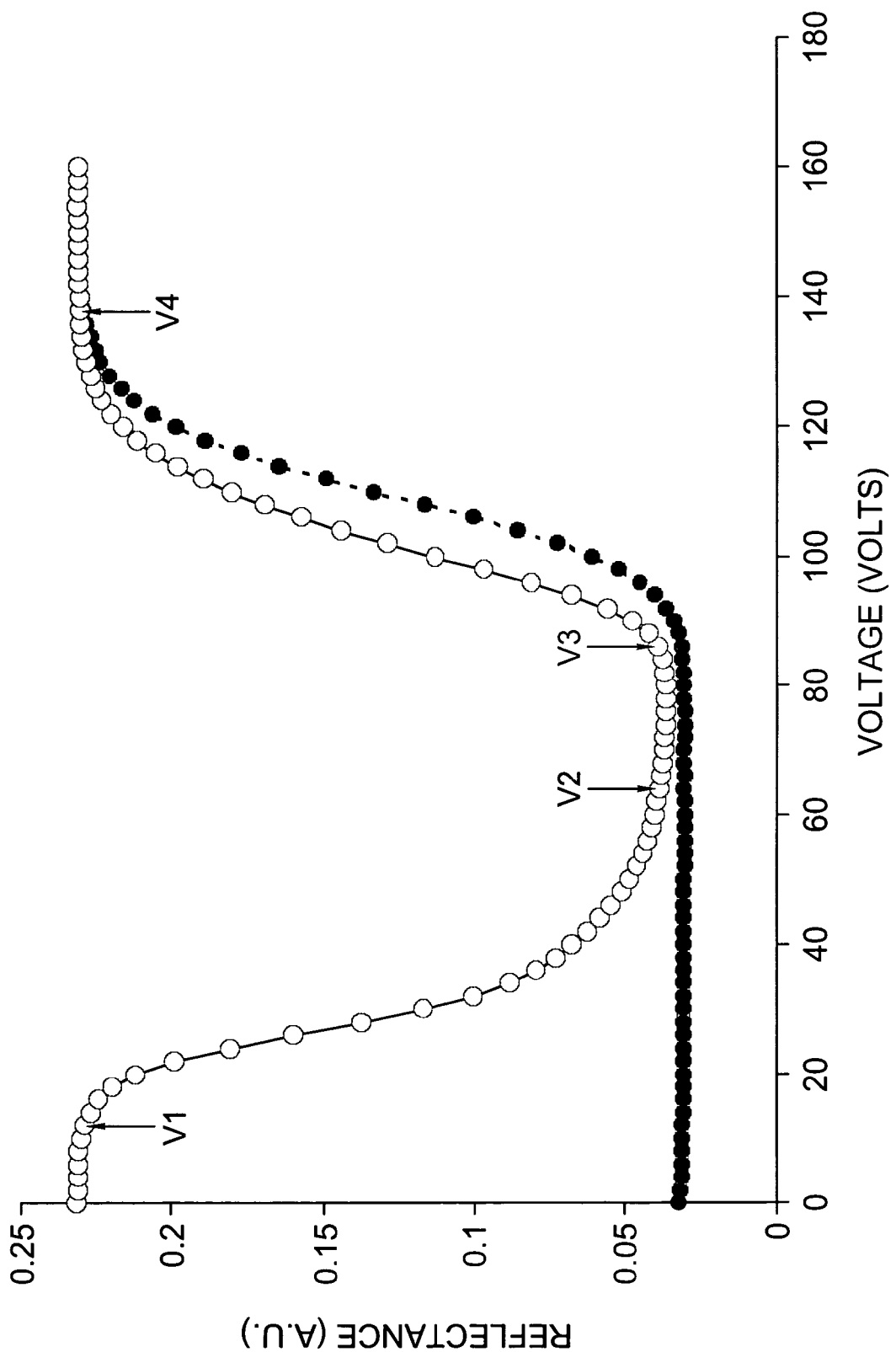
FIG. 11 illustrates the electro-optic response of a display device using polymer latex as binder in the imaging layer.

The electro-optic response of the device is shown in FIG. 11. The horizontal axis is the amplitude of the addressing voltage pulse and the vertical axis is the reflectance of the CLC material measured at 0 volts about 2 seconds after application of the addressing pulse. The reflectance was measured using an X-rite 938 spectrodensitometer. The addressing pulse was a square wave with frequency of 250 Hz and duration of 100 milliseconds. The open circles represent the response when the material was initially in the planar texture and the filled circles represent the response when the material was initially in the focal conic state. A voltage pulse higher than 138 volts (V4) switched the display into the reflecting state and a voltage pulse between 64 and 86 volts (V2 and V3 respectively) switched the display into the weakly scattering or dark state. Voltages less than V1 (12 volts) did not influence the state of the display. In this case the quantity Vqm, defined as 2V1/(V4−V3), was equal to 0.46. Once again it is clear that the voltage needed to switch the display into the reflecting state was significantly greater than that of the invention device. Furthermore, the contrast of a multiplexed display based on this method may be greatly inferior compared to the method of the invention because of the relatively low value of Vqm.

EXAMPLE 6

Those skilled in the art will appreciate that the phase-separated polymer domains are established or the monomer is polymerized after the emulsion domains have been formed around the liquid crystal, polymer mixture. In order to obtain at the black-white appearance of the display cell, the intrinsic pitch $P_o$ of the cholesteric material is adjusted so that $nP_o$ is around 600 nm (from orange color to red color), where n is the average refractive index of material. $nP_o$ determines the limit of the long wavelength side of the reflection spectrum.

A few percent polymer network is dispersed in the liquid crystal material. The polymer concentration is chosen to be about 3%. The polymer concentration should be high enough to cause the helical axes of the planar liquid crystal domains to distribute in a cone of angle around 40°, but be low enough not to cause too much scattering when the liquid crystal is in the weakly scattering focal conic texture. When the domains are in the planar texture, the material has a white appearance, while when the domains are in the focal conic texture, the material has a black appearance or whatever the color of the absorption layer is.

When a predetermined voltage value is applied to the cell and then removed to place the liquid crystal material in the reflecting planar texture, the helical axes of the cholesteric liquid crystal in the polymer domains are oriented along various directions around the normal of the cell. Under room light conditions, where light is incident on the cell from all directions, the light reflected from different domains has different colors because the incident angles in different domains are different. As such, the light observed by a human eye is an average of the reflection bands centered at different wavelengths, and has a white appearance. Therefore, when a voltage is supplied to the cell to drive the liquid crystal material into the focal conic texture and then removed, the orientation of the helical axes in the domains are essentially parallel to the cell surface. As such, the incident light is either diffracted or scattered in the forward direction and absorbed by an absorption layer at the bottom of the display. Since the absorption layer has a black color, the polymer domains associated with the focal conic texture appear black.

The invention has been described in detail with particular reference to certain preferred embodiments thereof, but it will be understood that variations and modifications can be effected within the spirit and scope of the invention.

The invention claimed is:

1. A high contrast reflective display comprising at least one substrate, at least one electrically conductive layer and at least one electronically modulated imaging layer, wherein said electronically modulated imaging layer comprises a close-packed, ordered monolayer of domains of electrically modulated material in a fixed polymer matrix.

2. The high contrast reflective display of claim 1 wherein said substrate is flexible.

3. The high contrast reflective display of claim 1 wherein said substrate is transparent.

4. The high contrast reflective display of claim 3 further comprising a second substrate.

5. The high contrast reflective display of claim 1 wherein said electrically conductive layer a surface conductivity of less than $10^4$ ohms/sq.

6. The high contrast reflective display of claim 1 wherein said electrically conductive conductive layer comprises ITO.

7. The display of claim 1 wherein said electrically conductive layer comprises polythiophene.

8. The high contrast reflective display of claim 1 further comprising at least a second electrically conductive layer, wherein said at least one close-packed, ordered monolayer of electrically modulated material in a crosslinked polymer matrix is between said at least one electrically conductive layer and said second conductive layer.

9. The high contrast reflective display of claim 1 wherein at least one electrically conductive layer is patterned.

10. The high contrast reflective display of claim 1 further comprising a means for applying electrical field across said at least one close-packed, ordered monolayer of electrically modulated material in a fixed polymer matrix.

11. The high contrast reflective display of claim 1 wherein said electrically modulating material is a liquid crystalline material.

12. The high contrast reflective display of claim 1 wherein said electrically modulated material comprises a bistable liquid crystalline material.

13. The high contrast reflective display of claim 12 wherein said bistable liquid crystalline material comprises a chiral nematic liquid crystal layer.

14. The high contrast reflective display of claim 1 wherein said at least one close-packed, ordered monolayer of electrically modulated material is a hexagonally closest packed monolayer of light modulating material.

15. The high contrast reflective display of claim 1 wherein said at least one close-packed, ordered monolayer of electrically modulated material has a repeat pattern or periodicity with a repeat distance of the order of the wavelength of visible light.

16. The high contrast reflective display of claim 1 wherein said fixed polymer matrix is a crosslinked polymer matrix.

17. The high contrast reflective display of claim 1 wherein said fixed polymer matrix is not rigid prior to drying.

18. The high contrast reflective display of claim 1 wherein said fixed polymer matrix is in a random configuration if the coating is dried at a temperature that is above the sol-gel transition temperature.

19. The high contrast reflective display of claim 1 wherein said fixed polymer matrix prior to crosslinking has a sol-gel transition temperature or thermal gelation temperature or chill set temperature below 23° C.

20. The high contrast reflective display of claim 1 wherein said fixed polymer matrix prior to crosslinking has a sol-gel transition temperature or thermal gelation temperature or chill set temperature below 10° C.

21. The high contrast reflective display of claim 1 wherein said electrically modulated material to said fixed polymer matrix ratio is from 6:1 to 0.5:1.

22. The high contrast reflective display of claim 1 wherein said electrically modulated material to said fixed polymer matrix ratio is 3:1.

23. The high contrast reflective display of claim 1 wherein said fixed polymer matrix comprises gelatin.

24. The high contrast reflective display of claim 23 wherein said gelatin is in a random coil configuration if the coating is dried at a temperature that is above the sol-gel transition temperature of gelatin.

25. The high contrast reflective display of claim 23 wherein said gelatin is fish gelatin.

26. The high contrast reflective display of claim 25 wherein said fish gelatin is deep water fish gelatin.

27. The high contrast reflective display of claim 23 wherein said gelatin has lower imino acid content than bovine gelatin.

28. The high contrast reflective display of claim 1 wherein said fixed polymer matrix further comprises a hardening agent.

29. The high contrast reflective display of claim 1 further comprising a protective layer.

30. The high contrast reflective display of claim 29 wherein said protective layer comprises gelatin.

31. The high contrast reflective display of claim 30 wherein said gelatin contains molecules in a helix configuration.

32. The high contrast reflective display of claim 1 wherein said electrically modulated imaging layer further comprises polyvinylalcohol (PVA).

33. The high contrast reflective display of claim 1 wherein said at least one electronically modulated imaging layer has a RMS surface roughness of less than 1.5 microns.

34. The high contrast reflective display of claim 1 comprising a stack of at least two of said high contrast reflective displays, wherein a stack comprises at least one substrate, at least one electrically conductive layer and at least one close-packed, ordered monolayer of domains of electrically modulated material in a fixed polymer matrix.

35. A method of making a high contrast reflective display comprising:
 providing a substrate;
 applying a conductive layer;
 applying at least one layer of domains of electrically modulated material in a polymer matrix;
 drying the at least one applied layer of said domains of electrically modulated material in a polymer matrix at a temperature above the chill set temperature or sol-gel transition temperature of said polymer matrix to permit self-assembly of said domains of electrically modulated material into a close-packed monolayer of said domains of electrically modulated material; and
 fixing said polymer matrix to preserve said close-packed monolayer of domains of electrically modulated material.

36. The method of claim 35 further comprising:
 applying a second aqueous layer containing gelatin;
 chill setting said second aqueous layer containing gelatin; and
 drying said second aqueous layer.

37. The high contrast reflective display of claim 1 wherein said at least one electronically modulated imaging layer further comprises a chiral nematic liquid crystal light modulating material having positive dielectric anisotropy and a pitch length effective to reflect light of approximately 600 nm and a UV curable polymer, wherein said chiral nematic liquid crystal light modulating material and said UV curable polymer cooperate to form focal conic texture and twisted planar texture that are stable in the absence of a field, and wherein said twisted planar texture is light reflecting and appears substantially white.

38. The high contrast reflective display of claim 37 wherein said twisted planar texture appears substantially white and wherein said focal conic texture is weakly scattering and appears as the same color as the rearmost surface of the display.

39. The high contrast reflective display of claim 37 further comprising a color contrast layer, wherein said focal conic texture appears substantially the same color as said color contrast layer.

40. The high contrast reflective display of claim 39 wherein said color contrast layer is black.

41. The high contrast reflective display of claim 37 wherein said UV curable polymer is present in an amount of 3% based on the total weight of said UV curable and said chiral nematic liquid crystal light modulating material.

* * * * *